United States Patent
Kalarot et al.

(10) Patent No.: US 12,530,592 B2
(45) Date of Patent: Jan. 20, 2026

(54) NON-LINEAR LATENT FILTER TECHNIQUES FOR IMAGE EDITING

(71) Applicant: Adobe Inc., San Jose, CA (US)

(72) Inventors: Ratheesh Kalarot, San Jose, CA (US); Wei-An Lin, San Jose, CA (US); Baldo Faieta, San Francisco, CA (US); Shabnam Ghadar, Menlo Park, CA (US)

(73) Assignee: Adobe Inc., San Jose, CA (US)

( * ) Notice: Subject to any disclaimer, the term of this patent is extended or adjusted under 35 U.S.C. 154(b) by 1171 days.

(21) Appl. No.: 17/468,498

(22) Filed: Sep. 7, 2021

(65) Prior Publication Data

US 2022/0121876 A1 Apr. 21, 2022

Related U.S. Application Data

(60) Provisional application No. 63/092,980, filed on Oct. 16, 2020.

(51) Int. Cl.
*G06N 3/08* (2023.01)
*G06F 3/04845* (2022.01)
(Continued)

(52) U.S. Cl.
CPC ......... *G06N 3/094* (2023.01); *G06F 3/04845* (2013.01); *G06F 3/04847* (2013.01);
(Continued)

(58) Field of Classification Search
CPC .................. G06N 3/094; G06N 3/08
See application file for complete search history.

(56) References Cited

U.S. PATENT DOCUMENTS

| | | |
|---|---|---|
| 9,129,190 B1 | 9/2015 | Ranzato |
| 9,373,057 B1 | 6/2016 | Erhan et al. |

(Continued)

FOREIGN PATENT DOCUMENTS

| | | |
|---|---|---|
| CN | 110796080 A | 2/2020 |
| EP | 3872747 A1 | 9/2021 |

OTHER PUBLICATIONS

NPL Abdal Image2StyleGAN How to Embed Images Into StyleGAN Latent Space 2019.*

(Continued)

*Primary Examiner* — Paul M Knight
(74) *Attorney, Agent, or Firm* — Kilpatrick Townsend & Stock LLP

(57) ABSTRACT

Systems and methods use a non-linear latent filter neural network for editing an image. An image editing system trains a first neural network by minimizing a loss based upon a predicted attribute value for a target attribute in a training image. The image editing system obtains a latent space representation of an input image to be edited and a target attribute value for the target attribute in the input image. The image editing system provides the latent space representation and the target attribute value as input to the trained first neural network for modifying the target attribute in the input image to generate a modified latent space representation of the input image. The image editing system provides the modified latent space representation as input to a second neural network to generate an output image with a modification to the target attribute corresponding to the target attribute value.

20 Claims, 9 Drawing Sheets
(3 of 9 Drawing Sheet(s) Filed in Color)

(51) Int. Cl.
*G06F 3/04847* (2022.01)
*G06F 18/21* (2023.01)
*G06F 18/211* (2023.01)
*G06F 18/214* (2023.01)
*G06F 18/40* (2023.01)
*G06N 3/045* (2023.01)
*G06N 3/094* (2023.01)
*G06N 20/20* (2019.01)
*G06T 3/02* (2024.01)
*G06T 3/18* (2024.01)
*G06T 3/40* (2006.01)
*G06T 3/4038* (2024.01)
*G06T 3/4046* (2024.01)
*G06T 5/20* (2006.01)
*G06T 5/77* (2024.01)
*G06T 11/00* (2006.01)
*G06T 11/60* (2006.01)
*G06V 10/28* (2022.01)
*G06V 10/98* (2022.01)

(52) U.S. Cl.
CPC .......... *G06F 18/211* (2023.01); *G06F 18/214* (2023.01); *G06F 18/2163* (2023.01); *G06F 18/40* (2023.01); *G06N 3/045* (2023.01); *G06N 3/08* (2013.01); *G06N 20/20* (2019.01); *G06T 3/02* (2024.01); *G06T 3/18* (2024.01); *G06T 3/40* (2013.01); *G06T 3/4038* (2013.01); *G06T 3/4046* (2013.01); *G06T 5/20* (2013.01); *G06T 5/77* (2024.01); *G06T 11/001* (2013.01); *G06T 11/60* (2013.01); *G06V 10/28* (2022.01); *G06V 10/98* (2022.01); *G06T 2207/10024* (2013.01); *G06T 2207/20081* (2013.01); *G06T 2207/20084* (2013.01); *G06T 2207/20221* (2013.01); *G06T 2210/22* (2013.01)

(56) References Cited

U.S. PATENT DOCUMENTS

| | | | |
|---|---|---|---|
| 10,373,055 B1 | 8/2019 | Matthey-de-l'Endroit et al. | |
| 10,430,946 B1 | 10/2019 | Zhou et al. | |
| 10,671,838 B1 | 6/2020 | Bogan et al. | |
| 10,825,219 B2 | 11/2020 | Fu et al. | |
| 10,902,571 B2 | 1/2021 | Naruniec et al. | |
| 11,200,638 B2 | 12/2021 | He et al. | |
| 11,222,466 B1 | 1/2022 | Naruniec et al. | |
| 11,227,187 B1 | 1/2022 | Weinberger | |
| 11,354,792 B2 | 6/2022 | Fisher et al. | |
| 11,354,823 B2 | 6/2022 | Lerchner et al. | |
| 11,494,667 B2 | 11/2022 | Carbune et al. | |
| 11,508,167 B2 | 11/2022 | Deng et al. | |
| 11,521,362 B2 | 12/2022 | Bondich et al. | |
| 11,544,880 B2 | 1/2023 | Park et al. | |
| 11,557,022 B2 | 1/2023 | Munkberg et al. | |
| 11,580,673 B1 | 2/2023 | Ren et al. | |
| 11,610,435 B2 | 3/2023 | Karras et al. | |
| 11,676,014 B1 | 6/2023 | Hallac | |
| 11,682,199 B2 | 6/2023 | Karras et al. | |
| 11,797,769 B1 | 10/2023 | Gangadharaiah et al. | |
| 11,875,221 B2 | 1/2024 | Lin et al. | |
| 11,880,766 B2 | 1/2024 | Smith et al. | |
| 11,907,839 B2 | 2/2024 | Kalarot et al. | |
| 11,915,133 B2 | 2/2024 | Kalarot et al. | |
| 11,978,268 B2 | 5/2024 | Deng et al. | |
| 11,983,628 B2 | 5/2024 | Lin et al. | |
| 12,327,188 B2 * | 6/2025 | Kalarot | G06F 3/04845 |
| 12,333,427 B2 | 6/2025 | Smith et al. | |
| 2012/0301023 A1 | 11/2012 | Braun et al. | |
| 2015/0063450 A1 | 3/2015 | Kim et al. | |
| 2015/0277686 A1 | 10/2015 | Laforge et al. | |
| 2015/0371422 A1 | 12/2015 | Kokemohr | |
| 2018/0225812 A1 | 8/2018 | Diverdi et al. | |
| 2018/0247201 A1 | 8/2018 | Liu et al. | |
| 2018/0314716 A1 | 11/2018 | Kim et al. | |
| 2019/0171908 A1 | 6/2019 | Salavon | |
| 2019/0172243 A1 | 6/2019 | Mishra et al. | |
| 2019/0213772 A1 | 7/2019 | Lombardi et al. | |
| 2019/0294108 A1 | 9/2019 | Ozcan et al. | |
| 2019/0295302 A1 | 9/2019 | Fu et al. | |
| 2019/0378242 A1 | 12/2019 | Zhang et al. | |
| 2019/0385064 A1 | 12/2019 | Malaya | |
| 2020/0034455 A1 | 1/2020 | Chandra Sekar Rao et al. | |
| 2020/0089755 A1 | 3/2020 | Shazeer et al. | |
| 2020/0134778 A1 | 4/2020 | He et al. | |
| 2020/0151559 A1 | 5/2020 | Karras et al. | |
| 2020/0242771 A1 | 7/2020 | Park et al. | |
| 2020/0242774 A1 | 7/2020 | Park et al. | |
| 2020/0250471 A1 | 8/2020 | Saruta et al. | |
| 2020/0349393 A1 | 11/2020 | Zhong | |
| 2020/0372297 A1 | 11/2020 | Terjek | |
| 2020/0372370 A1 | 11/2020 | Donahue et al. | |
| 2020/0372621 A1 | 11/2020 | Naruniec et al. | |
| 2020/0380338 A1 | 12/2020 | Matsumura | |
| 2021/0019541 A1 | 1/2021 | Wang et al. | |
| 2021/0142177 A1 | 5/2021 | Mallya et al. | |
| 2021/0182687 A1 | 6/2021 | Son et al. | |
| 2021/0209464 A1 | 7/2021 | Bala et al. | |
| 2021/0271867 A1 * | 9/2021 | Liu | G06N 3/084 |
| 2021/0279513 A1 | 9/2021 | Jie | |
| 2021/0283717 A1 | 9/2021 | Iyer et al. | |
| 2021/0319209 A1 | 10/2021 | Deng et al. | |
| 2021/0327038 A1 | 10/2021 | Helminger et al. | |
| 2021/0334935 A1 | 10/2021 | Grigoriev et al. | |
| 2021/0374402 A1 | 12/2021 | Kim et al. | |
| 2022/0028139 A1 * | 1/2022 | Mitra | G06N 3/0499 |
| 2022/0044352 A1 | 2/2022 | Liao et al. | |
| 2022/0051479 A1 | 2/2022 | Agarwal et al. | |
| 2022/0076374 A1 | 3/2022 | Li et al. | |
| 2022/0084173 A1 | 3/2022 | Liang et al. | |
| 2022/0084204 A1 | 3/2022 | Li et al. | |
| 2022/0108163 A1 | 4/2022 | Sokhandan Asl | |
| 2022/0121876 A1 | 4/2022 | Kalarot et al. | |
| 2022/0121931 A1 | 4/2022 | Kalarot et al. | |
| 2022/0121932 A1 | 4/2022 | Kalarot et al. | |
| 2022/0122221 A1 | 4/2022 | Smith et al. | |
| 2022/0122222 A1 | 4/2022 | Smith et al. | |
| 2022/0122232 A1 | 4/2022 | Lin et al. | |
| 2022/0122305 A1 | 4/2022 | Smith et al. | |
| 2022/0122306 A1 | 4/2022 | Lin et al. | |
| 2022/0122307 A1 | 4/2022 | Kalarot et al. | |
| 2022/0122308 A1 | 4/2022 | Kalarot et al. | |
| 2022/0138897 A1 | 5/2022 | Singh et al. | |
| 2022/0148244 A1 | 5/2022 | Ko et al. | |
| 2022/0156886 A1 | 5/2022 | Petrangeli et al. | |
| 2022/0198266 A1 | 6/2022 | Chakraborty et al. | |
| 2022/0254071 A1 | 8/2022 | Ojha et al. | |
| 2022/0309672 A1 | 9/2022 | Cherian et al. | |
| 2022/0366193 A1 | 11/2022 | Luo et al. | |
| 2023/0094954 A1 | 3/2023 | Sinha et al. | |
| 2023/0195281 A1 | 6/2023 | Charlton et al. | |
| 2023/0214953 A1 | 7/2023 | Yoo | |

OTHER PUBLICATIONS

NPL Gulrajani Improved Training of Wasserstein GANs WGAN-GP 2017.*
NPL Haerkoenen GANSpace Discovering Interpretable GAN Controls Jul. 2020.*
NPL He AttGAN Facial Attribute Editing 2018.*
NPL Jadon A survey of loss functions for semantic segmentation Sep. 2020.*
NPL Karim Intuitions on L1 and L2 Regularisation 2018.*
NPL Karras Progressive Growing of GANs 2018.*
NPL Karras Style Based Generator Architecture for GANs 2019.*
NPL Khodadadeh Latent to Latent Inventor Pub 2022.*
NPL Kramer InterFace software package for face image 2016.*
NPL Li GAN Compression Efficient Architectures for Interactive Conditional GANs Jun. 2020.*

(56) References Cited

OTHER PUBLICATIONS

NPL Shen InterFaceGAN Interpreting Disentangled Face Rep May 2020.*
NPL Vanrullen Reconstructing faces from fMRI patterns using DGNN 2019.*
NPL Yao Learning Non Linear Disentangled Editing for Stylegan Aug. 2021.*
NPL Viazovetskyi StyleGAN2 Mar. 2020.*
Final Office Action, mailed Feb. 12, 2025, U.S. Appl. No. 17/384,273, 17 pages.
Notice of Allowance, mailed Feb. 26, 2025, U.S. Appl. No. 17/384,283, 10 pages.
Notice of Allowance, mailed Feb. 26, 2025, U.S. Appl. No. 17/384,371, 13 pages.
U.S. Appl. No. 17/384,283, "Non-Final Office Action", Feb. 29, 2024, 9 pages.
U.S. Appl. No. 17/468,487, "Notice of Allowance", Mar. 6, 2024, 14 pages.
U.S. Appl. No. 17/468,511, "Corrected Notice of Allowability", Jan. 12, 2024, 2 pages.
U.S. Appl. No. 17/468,546, "Supplemental Notice of Allowability", Jan. 18, 2024, 2 pages.
Brock et al., "Neural Photo Editing with Introspective Adversarial Networks", Published as a conference paper at ICLR 2017, 2017, 15 pages.
Heinrich, "Photo Editing with Generative Adversarial Network (Part 2)", Available Online at: https://developer.nvidia.com/blog/photo-editing-generative-adversarial-networks-2/, Apr. 24, 2017, 8 pages.
U.S. Appl. No. 17/384,273, "Final Office Action", Mar. 26, 2024, 16 pages.
U.S. Appl. No. 17/384,283, "Final Office Action", Mar. 26, 2024, 20 pages.
U.S. Appl. No. 17/468,487, "Notice of Allowability", Apr. 11, 2024, 11 pages.
U.S. Appl. No. 17/468,487, "Notice of Allowability", Apr. 3, 2024, 11 pages.
Hou et al., "Deep Feature Similarity for Generative Adversarial Networks", 4th International Association for Pattern Recognition Asian Conference on Pattern Recognition (ACPR), Nov. 2017, pp. 115-119.
U.S. Appl. No. 17/384,273 entitled "Identity-Preserving Techniques for Generative Adversarial Network Projection", filed Jul. 23, 2021, 72 pages.
U.S. Appl. No. 17/384,283 entitled "Multi-Scale Output Techniques for Generative Adversarial Networks", filed Jul. 23, 2021, 72 pages.
U.S. Appl. No. 17/384,357 entitled "Techniques for Domain to Domain Projection Using a Generative Model", filed Jul. 23, 2021, 72 pages.
U.S. Appl. No. 17/384,371 entitled "Direct Regression Encoder Architecture and Training", filed Jul. 23, 2021, 66 pages.
U.S. Appl. No. 17/384,378, entitled "Supervised Learning Techniques for Encoder Training", filed Jul. 23, 2021, 67 pages.
U.S. Appl. No. 17/468,476 entitled "Attribute Decorrelation Techniques for Image Editing", filed Sep. 7, 2021, 71 pages.
U.S. Appl. No. 17/468,487 entitled "Attribute Control Techniques for Image Editing", filed Sep. 7, 2021, 71 pages.
U.S. Appl. No. 17/468,511 entitled "Detail-Preserving Image Editing Techniques", filed Sep. 7, 2021, 64 pages.
U.S. Appl. No. 17/468,546 entitled "Techniques for Smooth Region Merging in Image Editing", filed Sep. 7, 2021, 63 pages.
Abdal et. al., "Image2StyleGAN: How to Embed Images Into the StyleGAN Latent Space?," arXiv:1904.03189v2 [cs.CV], Sep. 3, 2019, 23 pages.
Abdal et. al., "StyleFlow: Attribute-conditioned Exploration of StyleGAN-Generated Images using Conditional Continuous Normalizing Flows", arXiv:2008.02401v2 [cs.CV], Sep. 20, 2020, 22 pages.
Abdulnabi et. al., "Multi-task CNN Model for Attribute Prediction", arXiv:1601.00400v1 [cs.CV], Jan. 4, 2016, 11 pages.
Goodfellow et al., "Generative Adversarial Nets", NIPS, arXiv:1406.2661v1, Jun. 10, 2014, 9 pages.
Karim, Raimi "Intuitions on L1 and L2 Regularisation", Towards Data Science, Dec. 26, 2018, 11 pages.
Karras et al., "A Style-Based Generator Architecture for Generative Adversarial Networks", https://arxiv.org/pdf/1812.04948.pdf, Mar. 29, 2019, 12 pages.
Minaee et. al., "Image Segmentation Using Deep Learning: A Survey," IEEE Transactions on Pattern Analysis and Machine Intelligence, doi: 10.1109/TPAMI.2021.3059968, Nov. 15, 2020, 22 pages.
Pang et al., "Image-to-Image Translation: Methods and Applications," arXiv:2101.08629v1 [cs.CV], Jan. 21, 2021, 19 pages.
Richardson et al., "Encoding in Style: a StyleGAN Encoder for Image-to-Image Translation", arXiv:2008.00951v1 [cs.CV], Aug. 3, 2020, 16 pages.
Shen et al., InterFaceGAN: Interpreting the Disentangled Face Representation Learned by GANs, arXiv:2005.09635v2, Oct. 29, 2020, 16 pages.
Tewari, et al. "StyleRig: Rigging StyleGAN for 3D Control over Portrait Images", 13 pages.
Zhu et al., "Generative Visual Manipulation on the Natural Image Manifold", arXiv:1609.03552v3 [cs.CV], Dec. 16, 2018.
"A Stylemap-Based Generator for Real-Time Image Projection and Local Editing", ICLR 2021, 13 pages.
Deng et al., "ArcFace: Additive Angular Margin Loss for Deep Face Recognition", arXiv:1801.07698v3 [cs.CV], Feb. 9, 2019, 11 pages.
He et al., "Deep Residual Learning for Image Recognition", arXiv:1512.03385v1 [cs.CV], Dec. 10, 2015, 12 pages.
Huang et al., "Arbitrary Style Transfer in Real-time with Adaptive Instance Normalization", Department of Computer Science & Cornell Tech, Cornell University, 10 pages.
Karras et al., "Progressive Growing of GANS for Improved Quality, Stability, and Variation", ICLR, arXiv:1710.10196v3 [cs.NE], Feb. 26, 2018, pp. 26.
Karras et al., "Analyzing and Improving the Image Quality of StyleGAN", arXiv:1912.04958v2 [cs.CV], Mar. 23, 2020, 21 pages.
Pidhorskyi et al., "Adversarial Latent Autoencoders", arXiv:2004.04467v1 [cs.LG], Apr. 9, 2020, 10 pages.
Rajarapollu et al., "Bicubic Interpolation Algorithm Implementation for Image Appearance Enhancement" IJCST vol. 8, Issue 2, Apr.-Jun. 2017, 4 pages.
Simonyan et al., "Very Deep Convolutional Networks for Large-Scale Image Recognition", arxiv:1409.1556v6 [cs.CV], Apr. 10, 2015, 14 pages.
Zhang et al., "The Unreasonable Effectiveness of Deep Features as a Perceptual Metric", pp. 586-595, 10 pages.
Zhu et al., "Generative Visual Manipulation on the Natural Image Manifold", arXiv:1609.03552v2 [cs.CV], Sep. 25, 2016, 16 pages.
Zhu et al., "In-Domain GAN Inversion for Real Image Editing", arXiv:2004.00049v3 [cs.CV], Jul. 16, 2020, 31 pages.
Gao et al., "Res2Net: A New Multi-scale Backbone Architecture", arXiv:1904.01169v3 [cs.CV], Jan. 27, 2021, 11 pages.
Wiles et al., "Using Bottlenecks in Feedforward Networks as a Dimension Reduction Technique: An Application to Optimization Tasks", Neural Computation 8, 1179-1183, 1996, Downloaded from http://direct.mit.edu/neco/article-pdf/8/6/1179/813336/neco.1996.8.6.1179.pdf on Apr. 28, 2021, 5 pages.
Biswas et al., "Spatially Variant Laplacian Pyramids for Multi-Frame Exposure Fusion," arXiv:2002.01425v1, Feb. 4, 2020, 10 pages.
Burt et al., "The Laplacian Pyramid as a Compact Image Code," IEE Transactions on Communications vol. Com-31, No. 4, Apr. 1983, pp. 532-540.
Dahlke et al., "Multiscale Approximation," Understanding Complex Systems, 2007, 35 pages.
Glasbey et al., "A Review of Image Warping Methods," Journal of Applied Statistics 25, 1998, pp. 155-171.
Karasaridis et al., "A Filter Design Technique for Steerable Pyramid Image Transforms," Proc. Int'l Conf Acoustics Speech Signal Processing (ICASSP) IV, 1996, pp. 2387-2390.
Khabarlak et al., "Fast Facial Landmark Detection and Applications: A Survey," arXiv:2101.10808 (2021).

(56) References Cited

OTHER PUBLICATIONS

Smith et al., "Alpha and the History of Digital Compositing," Technical Memo 7, Microsoft Corporation, Aug. 15, 1995, 10 pages.
Wu et al, "Towards fitting a 3D dense facial model to a 2D image: A landmark-free approach", 8 pages.
Zou et al., "Object Detection in 20 Years: A Survey," arXiv:1905.05055 May 16, 2019, 39 pages.
"Basics of Affine Transformation," Neutrium, https://neutrium.net/mathematics/basics-of-affine-transformation/ (2012).
Non-Final Office Action, mailed Oct. 21, 2024, U.S. Appl. No. 17/384,371, 31 pages.
Li et al., "Facial Attribute Editing by Latent Space Adversarial Variational Autoencoders", 24th International Conference on Pattern Recognition (ICPR), Aug. 20-24, 2018, pp. 1337-1342.
Mardani et al., "Deep Generative Adversarial Neural Networks for Compressive Sensing (GANCS) MRI", Institute of Electrical and Electronics Engineers Transactions on Medical Imaging, vol. 38, No. 1, Jan. 2019, pp. 167-179.
Wang et al., "Enhancing HEVC Spatial Prediction by Context-based Learning", ICASSP 2019—2019 Institute of Electrical and Electronics Engineers International Conference on Acoustics, Speech and Signal Processing (ICASSP), May 12-17, 2019, 6 pages.
Notice of Allowance, mailed Jul. 7, 2023, U.S. Appl. No. 17/384,357, 13 pages.
Non-Final Office Action, mailed Jun. 22, 2023, U.S. Appl. No. 17/468,476, 15 pages.
Hahn et al., "Disentangling Latent Factors of Variational Auto-Encoder with Whitening", Artificial Neural Networks and Machine Learning-ICANN, 2019, pp. 590-603.
Liu et al., "Towards Disentangling Latent Space for Unsupervised Semantic Face Editing", IEEE, Trans Image Process, 2022, 14 pages.
Zhu et al., "Generative Visual Manipulation on the Natural Image Manifold", arXiv:1609.03552 [cs.CV], Dec. 16, 2018, 16 pages.
Non-Final Office Action, mailed Dec. 6, 2024, U.S. Appl. No. 17/384,378, 28 pages.
Non-Final Office Action, mailed Dec. 7, 2023, U.S. Appl. No. 17/384,273, 12 pages.
Corrected Notice of Allowability, mailed Nov. 30, 2023, U.S. Appl. No. 17/384,357, 2 pages.
Corrected Notice of Allowability, mailed Dec. 13, 2023, U.S. Appl. No. 17/468,476, 2 pages.
Corrected Notice of Allowability, mailed Dec. 14, 2023, U.S. Appl. No. 17/468,511, 2 pages.
Supplemental Notice of Allowance, mailed Dec. 4, 2023, U.S. Appl. No. 17/468,546, 2 pages.
Kapusta et al., "Facial Appearance Modifications Using Skpca-derived Features Extracted From Convolutional Autoencoder's Latent Space", 2020 International Joint Conference on Neural Networks (IJCNN), (Jul. 1, 2020).
Advisory Action, mailed Jul. 5, 2024, U.S. Appl. No. 17/384,273, 5 pages.
Notice of Allowance, mailed Oct. 12, 2023, U.S. Appl. No. 17/384,357, 9 pages.
Notice of Allowance mailed Oct. 6, 2023, U.S. Appl. No. 17/468,476, 9 pages.
Notice of Allowance mailed Nov. 2, 2023, U.S. Appl. No. 17/468,546, 10 pages.
Huang et al., "Arbitrary Style Transfer in Real-time with Adaptive Instance Normalization", Proceedings of the IEEE International Conference on Computer Vision, 2017, pp. 1501-1510.
Zhang et al., "The Unreasonable Effectiveness of Deep Features as a Perceptual Metric", Proceedings of the IEEE International Conference on Computer Vision, 2018, pp. 586-595, 10 pages.
Wiles et al., "Using Bottlenecks in Feedforward Networks as a Dimension Reduction Technique: An Application to Optimization Tasks", Neural Computation 8, 1996, pp. 1179-1183.
Tewari, et al. "StyleRig: Rigging StyleGAN for 3D Control over Portrait Images", arXiv:2004.0012v2, Jun. 13, 2020, 13 pages.
Wu et al., "Towards fitting a 3D dense facial model to a 2D image: A landmark-free approach", 2015 IEEE 7th International Conference on Biometrics Theory, Applications and Systems (BTAS), 2015, 8 pages.
Non-Final Office Action, mailed Aug. 28, 2024, U.S. Appl. No. 17/384,273, 14 pages.
Final Office Action, mailed Sep. 10, 2024, U.S. Appl. No. 17/384,283, 10 pages.
Corrected Notice of Allowability, mailed Nov. 17, 2023, U.S. Appl. No. 17/468,476, 2 pages.
Notice of Allowance, mailed Nov. 13, 2023, U.S. Appl. No. 17/468,511, 10 pages.
Supplemental Notice of Allowability, mailed Nov. 17, 2023, U.S. Appl. No. 17/468,546, 2 pages.
Gur et al., "Hierarchical Patch Vae-gan: Generating Diverse Videos From a Single Sample", Advances in Neural Information Processing Systems, vol. 33, Available online at: https://doi.org/10.48550/arXiv.2006.12226, 2020, pp. 16761-16772.
Kalarot et al., "Component Attention Guided Face Super-Resolution Network: Cagface", Proceedings of the IEEE/CVF Winter Conference on Applications of Computer Vision, 2020.
Karnewar et al., "Msg-gan: Multi-scale Gradients for Generative Adversarial Networks", Proceedings of the IEEE/CVF Conference on Computer Vision and Pattern Recognition, Available online at: https://doi.org/10.48550/arXiv.1903.06048, 2020, pp. 1-18.
Kohl et al., "A Hierarchical Probabilistic U-net for Modeling Multi-scale Ambiguities", Available Online At: https://doi.org/10.48550/arXiv.1905.13077, May 30, 2019, pp. 1-25.
Yi et al., "Bsd-gan: Branched Generative Adversarial Network for Scale-disentangled Representation Learning and Image Synthesis", IEEE Transactions on Image Processing, vol. 29, Available Online At: https://ieeexplore.ieee.org/document/9165961, 2020, pp. 9073-9083.
Zhang et al., "Nested Scale-editing for Conditional Image Synthesis", Proceedings of the IEEE/CVF Conference on Computer Vision and Pattern Recognition, Available Online At: https://arxiv.org/abs/2006.02038, Jun. 3, 2020, pp. 1-18.
Corrected Notice of Allowability, mailed Mar. 26, 2025, U.S. Appl. No. 17/384,283, 2 pages.
Corrected Notice of Allowability, mailed May 20, 2025, U.S. Appl. No. 17/384,283, 2 pages.
Corrected Notice of Allowability, mailed Mar. 12, 2025, U.S. Appl. No. 17/384,371, 2 pages.
Corrected Notice of Allowability, mailed May 15, 2025, U.S. Appl. No. 17/384,371, 2 pages.
Corrected Notice of Allowability, mailed May 19, 2025, U.S. Appl. No. 17/384,378, 2 pages.
Notice of Allowance mailed May 9, 2025, U.S. Appl. No. 17/384,378. 21 pages.

\* cited by examiner

NON-LINEAR LATENT FILTER TECHNIQUES FOR IMAGE EDITING

CROSS-REFERENCE TO RELATED APPLICATIONS

This application is a non-provisional application of and claims the benefit of the filing date of U.S. Provisional Application 63/092,980, filed on Oct. 16, 2020, which is herein incorporated by reference in its entirety for all purposes.

This application is also related to the concurrently filed applications titled "Attribute Decorrelation Techniques for Image Editing" and "Attribute Control Techniques for Image Editing," which are herein incorporated by reference in their entirety for all purposes.

This application is also related to U.S. patent application Ser. No. 17/384,273, 17/384,283, 17/384,357, 17/384,371, and 17/384,378, filed Jul. 23, 2021, which are herein incorporated by reference in their entirety for all purposes.

This application is also related to the concurrently filed applications titled "Detail-Preserving Image Editing Techniques" and "Techniques for Smooth Region Merging in Image Editing," which are herein incorporated by reference in their entirety for all purposes.

TECHNICAL FIELD

This disclosure generally relates to image editing techniques. More specifically, but not by way of limitation, this disclosure relates to improved image editing using non-linear latent filters.

BACKGROUND

Many image editing tools provide features that enable a user to edit or modify an image. Some of these tools even use machine learning-based techniques for editing images. However, the image editing capabilities of existing tools are quite limited—the recreation of images is not accurate, the editing is limited to low-resolution images (e.g., 256×256) (i.e., large high resolution images cannot be processed at all or cannot be processed in a reasonable time frame for the desired end result), unwanted artifacts and effects are introduced into the recreated images, and other deficiencies.

Some image editing tools use machine learning models such as Generative Adversarial Networks (GANs) to generate realistic edited images. While GANs have been very successful in generating high quality edited images, existing techniques using GANs still have several shortcomings. Existing techniques for editing images using machine learning suffer from shortcomings in editing the images in a realistic fashion and in providing the user with adequate control over the edits.

SUMMARY

The present disclosure describes techniques for editing images to efficiently generate realistic and accurate edited images. More particularly, new and improved techniques are described for editing an image to control a selected attribute while maintaining realism and consistency among other attributes.

In some embodiments, an input image to be edited is processed using one or more machine learning models to generate a numerical representation of the input image that corresponds to a Generative Adversarial Network (GAN) trained to generate an image from such a numerical representation. This numerical representation is referred to as a latent space representation of the input image. The latent space representation is edited using an editing non-linear latent filter neural network to generate edits in the ultimate output image. The techniques described herein apply edits in a targeted fashion while providing improved results.

In some embodiments, a computer-implemented method includes training a first neural network by minimizing a loss based upon a predicted attribute value for a target attribute in a training image; obtaining a latent space representation of an input image to be edited and a target attribute value for the target attribute in the input image; providing the latent space representation and the target attribute value as input to the trained first neural network for modifying the target attribute in the input image to generate a modified latent space representation of the input image; and providing the modified latent space representation as input to a second neural network to generate an output image with a modification to the target attribute, wherein the output image comprises a change in the target attribute corresponding to the target attribute value.

In some embodiments, the loss is a first loss component and training the first neural network further includes minimizing a second loss component based upon a segmented portion of an input training image associated with the target attribute. Training the first neural network may further include minimizing a third loss component based upon an L1 norm of a training latent code and an output of the first neural network given the training latent code.

In some embodiments, the second neural network includes a plurality of layers, and providing the modified latent space representation as input to the second neural network further includes selecting a subset of the layers associated with the target attribute and providing the modified latent space representation to the selected subset of the layers.

In some embodiments, the target attribute is a first target attribute and the target attribute value is a first target attribute value, and the method further includes obtaining a second target attribute value of a second target attribute in the input image and providing the second target attribute value, along with the latent space representation and the first target attribute value, as input to the trained first neural network. The output image includes a change in the first target attribute corresponding to the first target attribute value as well as a change in the second target attribute corresponding to the second target attribute value.

In some embodiments, the method further includes causing display of a user interface comprising a plurality of interactive components configured to control a respective plurality of attributes including the target attribute and receiving input specifying the modification to the target attribute, and the target attribute value is obtained based on the specified modification. In some embodiments, obtaining the latent space representation of the input image comprises generating the latent space representation of the input image by applying a machine learning model to the input image.

In some embodiments, a computing system includes a memory; a processor; a non-transitory computer-readable medium comprising instructions which, when executed by the processor, perform the steps of: training a first neural network by minimizing a loss based upon a predicted attribute value for a target attribute in a training image; obtaining a latent space representation of an input image to be edited and a target attribute value for the target attribute in the input image; providing the latent space representation and the target attribute value as input to the trained first neural network for modifying the target attribute in the input image to generate a modified latent space representation of the input image; and providing the modified latent space representation as input to a second neural network to generate an output image with a modification to the target attribute, wherein the output image comprises a change in the target attribute corresponding to the target attribute value.

In some embodiments, a non-transitory computer-readable medium has instructions stored thereon, the instructions executable by a processing device to perform operations including training a first neural network by minimizing a loss based upon a predicted attribute value for a target attribute in a training image; obtaining a latent space representation of an input image to be edited and a target attribute value for the target attribute in the input image; and a step for generating an output image comprising a change in the target attribute corresponding to the target attribute value by providing the latent space representation and the target attribute value as input to the trained first neural network for modifying the target attribute in the input image.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1A:
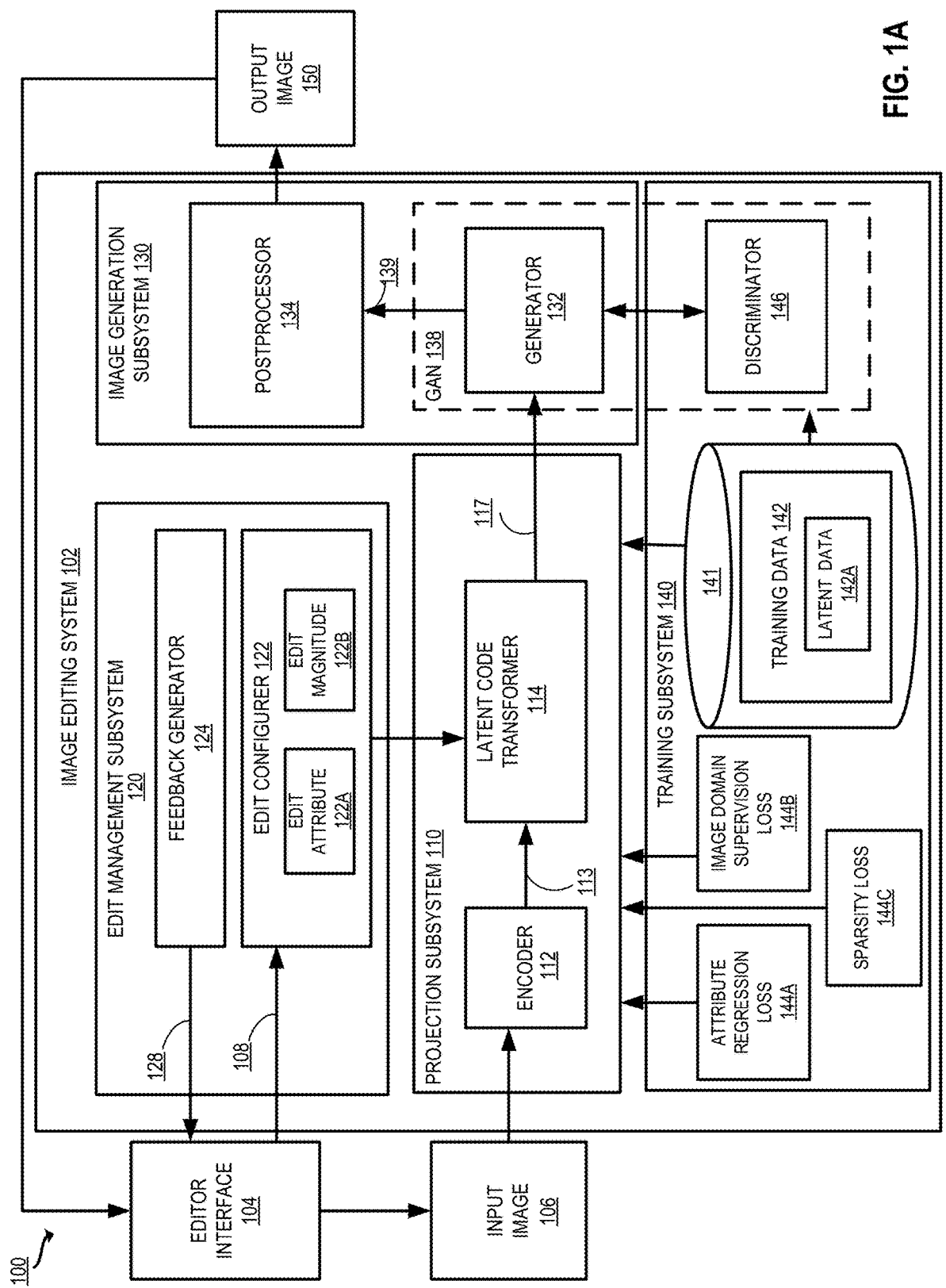
FIGS. 1A-1B depicts an example of a computing environment for editing an image using a non-linear latent filter according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for editing images to efficiently generate realistic and accurate edited images. More particularly, new and improved image editing techniques are described for editing or modifying images using non-linear latent filters.

As a specific example of image editing, facial attributes editing refers to functionality which enables users to edit single or multiple attributes (e.g., age, smile, hair color, or accessories) of a face in an image. For example, the input image may depict a face of a person of age "X." Edits may then be made to the image to change the age of the person, either make the person older or younger. For example, the image may be edited such that in the edited output image the face of the person corresponds to age "Y," where "Y" is different from "X." In addition to the age, a user may, in parallel, also make edits to other attributes of the face. For example, in addition to editing the age, edits may be made to add a smile to the face such that in the edited output image the face has a smile. As another example, edits may be made to change the appearance of the hair in the images. For example, the face depicted in the input image may have blonde curly hair and the image may be edited such that in the edited output image the face has black straight hair. As yet another example, the face in the input image may be edited to add one or more accessories (e.g., glasses, earrings). For example, the face in the input image may not wear glasses, and the image may be edited such that in the edited output image the face wears glasses. In a similar manner, a user may want to make various different types of edits to the face and many of these edits may be done in parallel or may be combined with one another.

Existing machine learning-based solutions mainly follow the formulation of image-to-image (I2I) translation techniques for making such edits. In some such I2I translation techniques, a deep neural network is trained to transform input face images directly to the output face images with the edits. For example, an input image is provided as input to a trained neural network along with edits to be made to a target attribute (e.g., age, hair color, etc.) and the neural network outputs an edited image in which the target attribute is edited. However, most of these existing approaches are limited in the edits that can be performed. For example, existing I2I approaches generally cannot handle continuous editing wherein an attribute is edited by changing the intensity of the attribute change over a series of intensity values (i.e., editing a target attribute by smoothly changing a particular parameter for the attribute over a series of values). As a specific example, existing solutions generally cannot be used to control editing the age of a face along a continuum (e.g., using a slider where a user can continuously move the slider to increase or decrease the age). Additionally, the quality of the edits made using existing machine learning-based techniques is also restricted and limited to low-resolution face images (e.g. 256×256 pixels). Existing I2I solutions also cannot be used to edit multiple target attributes at the same time, for example, to simultaneously control changing the age and facial hair of a face in an input image.

Some existing editing tools take in an input image and use machine learning techniques to first generate an intermediate representation of the image, referred to as latent space representation of the input image. Edits are then made to the latent space representation of the input image, and the final edited output image is then generated using machine learning techniques based upon the edited latent space representation. However, underlying models used during an inference phase may introduce unwanted results or limitations for editing the image. As an example, a continuous flow model may be used to generate the modified latent space representation. The continuous flow model may rely on an attribute prediction network to provide initial estimates of the image attribute values, and if the initial estimates are inaccurate, such as for hair color, the final edited output image, which is generated based on the initial estimates, will also be inaccurate and introduce undesired artifacts in the output image. Additionally, using the attribute prediction network during inference can be computationally expensive. Moreover, some existing machine learning techniques manipulate latent codes by conditioning on parameters of a parametric face model. The parameters are related to target attributes by the parametric face model. But, the number of distinct attributes that can be manipulated is limited by the expressiveness of the underlying model. For example, if the underlying parametric face model is a three-dimensional face model that does not capture an attribute of light, then the final edited output image may not be able to be generated.

The techniques described herein address these shortcomings and others and further provide additional features and functionalities. In certain embodiments, the disclosed techniques include new and improved machine learning-based techniques such as using a neural network trained to apply a non-linear modification ("non-linear latent filter") to efficiently and quickly generate edited output images that are accurate (e.g., accurately represent the desired edits without introducing undesired artifacts). The techniques can also provide continuous editing of images, such that each value along a range of potential values for an attribute can be achieved.

In certain embodiments, according to the techniques described in this disclosure, to edit an input image with an editing non-linear latent filter neural network, a latent space representation $W^{in}_p$ of an input image x (e.g., an image provided by a user to be edited) is generated. This latent space representation $W^{in}_p$ is then provided as input to a trained editing non-linear latent filter neural network along with target attribute values (e.g., specifying an amount of a smile, an age, gender, etc.), where the trained editing non-linear latent filter neural network then produces a modified latent space representation $W^{out}_p$. The modified latent space representation represents the input image with the target attribute value. The modified latent space representation is provided as input to a generator neural network to generate an image $g(W^{in}_p)$ that is similar to the user-specified image x, but with the applied edits. Through training, the editing non-linear latent filter neural network is taught to adjust a latent space representation, corresponding to an input image, such that the output image of the generator will reflect the specified edits.

In certain embodiments described in this disclosure, the techniques that are used for editing images include the use of non-linear latent filters to edit one or more attributes in an image using neural networks to generate an edited image. An editing non-linear latent filter neural network is trained using an attribute prediction model to apply targeted attribute changes to a latent space representation of an image. As a result, target attribute values can be achieved without using a prediction model or shape model during inference.

Once trained, the editing non-linear latent filter neural network can be used to edit an image with improved results. For example, a latent space representation of an input image to be edited and a target attribute value for a target attribute in the input image are input to the trained editing non-linear latent filter neural network. The trained editing non-linear latent filter neural network will modify the target attribute per the target attribute value, such that in the ultimate output image targeted attribute is edited to reflect the target value. For example, a face may be edited to make it look older, younger, add or remove glasses, change the positioning of the face, and so forth. As another example, a non-linear latent filter can be applied to an image of a tree to increase the height of the tree, change the amount of flowers or type of leaves on the tree, and so forth.

The novel techniques described herein provide improved image editing with non-linear latent filters. The trained editing non-linear latent filter neural network is a lightweight neural network trained using a predictor model to predict an attribute value, such that the trained editing non-linear latent filter neural network can change a target attribute in an image according to a target attribute value. This results in a trained editing non-linear latent filter neural network that can directly apply changes to a target attribute in a latent space representation of an image, without the limitations of a parametric face model or the need for an attribute prediction model at runtime. Both attribute scoring and shape modeling, as performed in prior systems, can create errors in non-edited regions of the image or cause the edited regions to be edited too much or too little. Further, both attribute scoring and shape modeling are costly in terms of computational resources and time. Thus, by obviating the need for attribute prediction or shape modeling at runtime, the editing process is more accurate, faster, and less computationally expensive. Additionally, unlike some existing solutions, the techniques described herein can be used for continuous and/or multiple attribute editing.

The following non-limiting example is provided to introduce certain embodiments. In this example, an image editing system applies a trained editing non-linear latent filter neural network to edit an attribute in an image. As a specific example, an input image contains a human face. Attributes of a human face depicted in the image that can be edited, individually or in combination, may include hair color, age, gender, expression (e.g., smiling or angry), presence or absence of accessories (e.g., eyeglasses), skin color, pose (e.g., the pitch or tilt of the face), and others.

The following example describes examples of techniques used to overcome the problem with generating finely edited images. In certain embodiments, an image editing system trains and applies an editing non-linear latent filter neural network to edit a target attribute in an image. For example, to train an editing non-linear latent filter neural network for age, in certain embodiments, the image editing system minimizes a loss based upon a predicted attribute value for the target attribute, age, in training images. For each training image, a latent space representation, along with a target attribute value for the target attribute, are provided as input to the editing non-linear latent filter neural network. The editing non-linear latent filter neural network outputs a modified latent space representation with a change to this target attribute based on the target attribute value. For example, given the target attribute of age, if the target attribute value is 88, the latent space representation is edited so that the ultimate output image will appear older. This modified latent space representation is provided as input to a generator neural network to generate a generated training image. The generated training image is then provided as input to an attribute predictor model, which predicts an attribute value. For example, if, during training, the editing non-linear latent filter neural network produces an image comprising a face that appears to be 77 years of age, the attribute predictor model predicts an attribute value of 77. A loss between the predicted attribute value and the input target attribute value is minimized. This minimized loss is used to train the editing non-linear latent filter neural network.

Once the editing neural network has been adequately trained, it can then be used during "runtime" or "production" time as part of an image editing system to edit images. The image editing system uses the trained editing neural network to generate an edited image at runtime. A user of the image editing system may provide an image (input image) that is to be edited. The image editing system may also provide user-selectable options that enable a user of the system to identify an attribute (the target attribute or multiple target attributes) in the image to be edited and a target value for the target attribute(s). As part of the processing, the input image is provided as input to a trained encoder neural network that is configured to generate a latent space representation for the input image. The latent space representation for the input image along with information indicative of the target attribute to be edited and the target attribute value are provided as inputs to the trained editing non-linear latent filter neural network. The trained editing non-linear latent filter neural network produces as output a modified latent space representation of the input image and which also encodes the edits to be applied to the image. This modified latent space representation encodes the input image with the target attribute being edited to the target value. For example, changes are made to the latent space representation corresponding to an increase in age, if the target attribute value corresponds to an older age.

The image editing system then uses the modified latent space representation to generate an output image such that in the output image the targeted face attribute is edited per the desired edit. In certain embodiments, as part of generating the output edited image, the modified latent space representation is provided as input to a multi-layered neural network (e.g., a generator such as a StyleGAN generator), which is configured to output a computer-generated image corresponding to the modified latent space representation. Because of the trained editing non-linear latent filter neural network, the output image that looks perceptually similar to the input image, with the desired edit or modification made to the target attribute value and where the degree or intensity of the change to the target attribute is per the target value, and where the edit is made without changing other attributes of the face and without introducing undesired artifacts. For example, the age of the face in the output image is changed to the desired age (e.g., increased or decreased) without changing other attributes of the face such as gender, facial expression, etc.

Accordingly, as described herein, the present disclosure describes improved machine-learning techniques to edit images with fine-edit capabilities and to produce images with improved accuracy of target attribute values. The described techniques solve many of the problems inherent in existing computer-implemented image editing environments. For example, techniques are described that improve the precision attribute editing. Additionally, the techniques of the present disclosure improve the speed of attribute editing. Further, the techniques of the present disclosure enable high precision, continuous, and multi-attribute editing. These improvements are provided by using a novel and improved non-linear latent filter for image editing.

Example of an Image Editing System

Figure 1B:
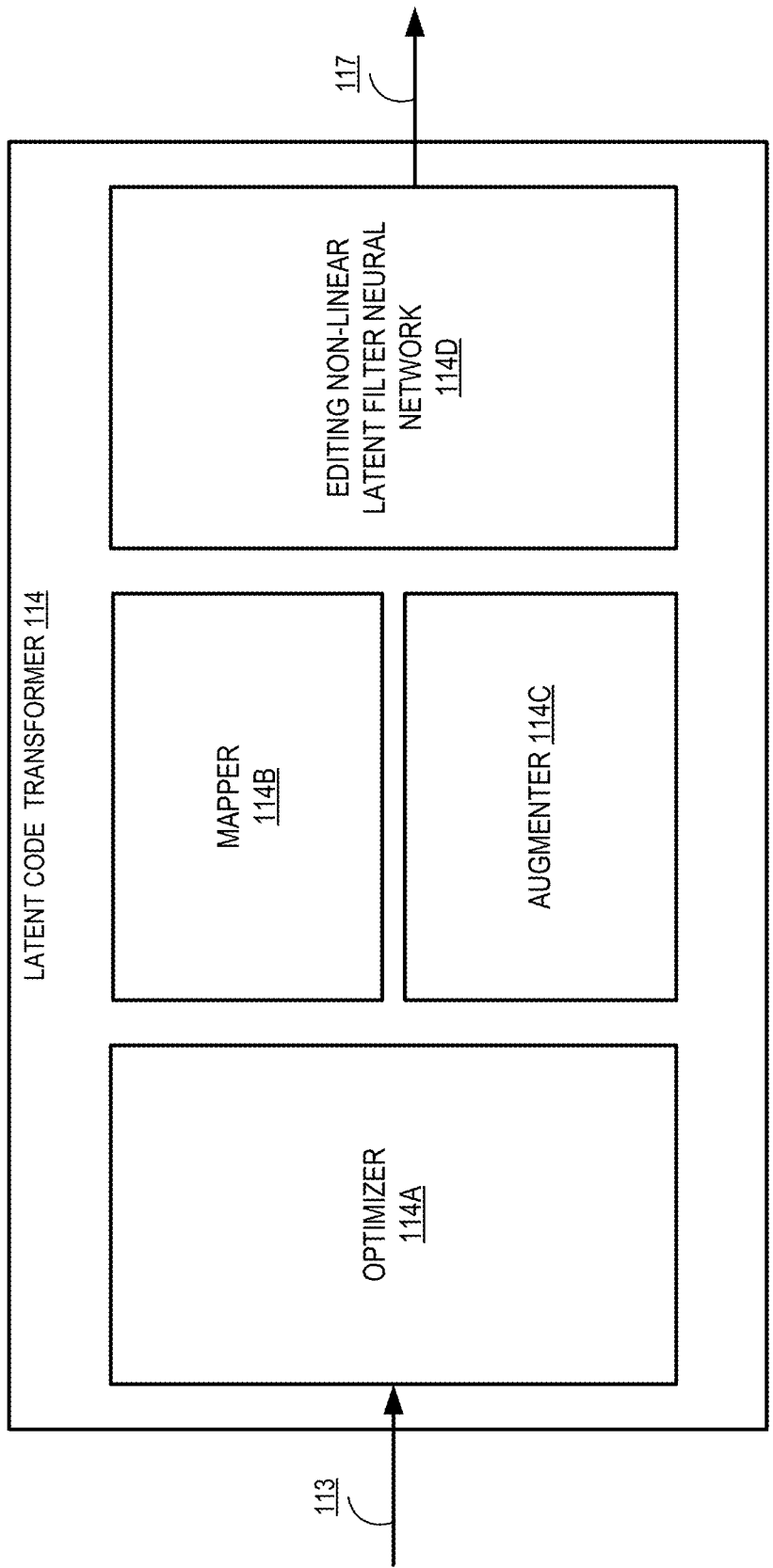

FIGS. 1A-1B depict an example of a computing environment 100 including an image editing system 102 that provides capabilities for editing electronic content such as digital photos and images. For example, as depicted in FIG. 1A, the image editing system 102 may receive as inputs an input image 106 that is to be edited and one or more edits to be made to the input image 106. The image editing system 102 is configured to edit the input image 106 per the edits and generate an output image 150 that is an edited representation of the input image 106 and incorporates the edits.

There are various ways in which the input image 106 and the edits to be made are input to the image editing system 102. In the example depicted in FIGS. 1A-1B, the image editing system 102 may provide an editor interface 104 that a user may use to provide inputs regarding the input image 106 to be edited and the one or more edits (e.g., edit parameters 108 to be made to the input image 106). The image editing system 102 then generates an edited output image 150 by applying the user-provided edits to the input image 106. In certain embodiments, the edited output image 150 may be presented or output to the user using the editor interface 104.

In some embodiments, the editor interface 104 may include one or Graphical User interfaces (GUIs) that enable a user to provide inputs identifying the input images, identifying the edits to be made to be made, setting configuration parameters for the image editing system 102, and the like. For example, a GUI may include one or more user-selectable elements that enable a user to input images 106 to be edited. One or more GUIs provided by the editor interface 104 may include one or more upload elements for uploading content (e.g., an upload field to upload an image to be edited). In some implementations, the editor interface 104 responds to user selection of an upload element by transitioning to a view showing available files to upload, prompt a user to take a photo, or the like.

Figure 4:
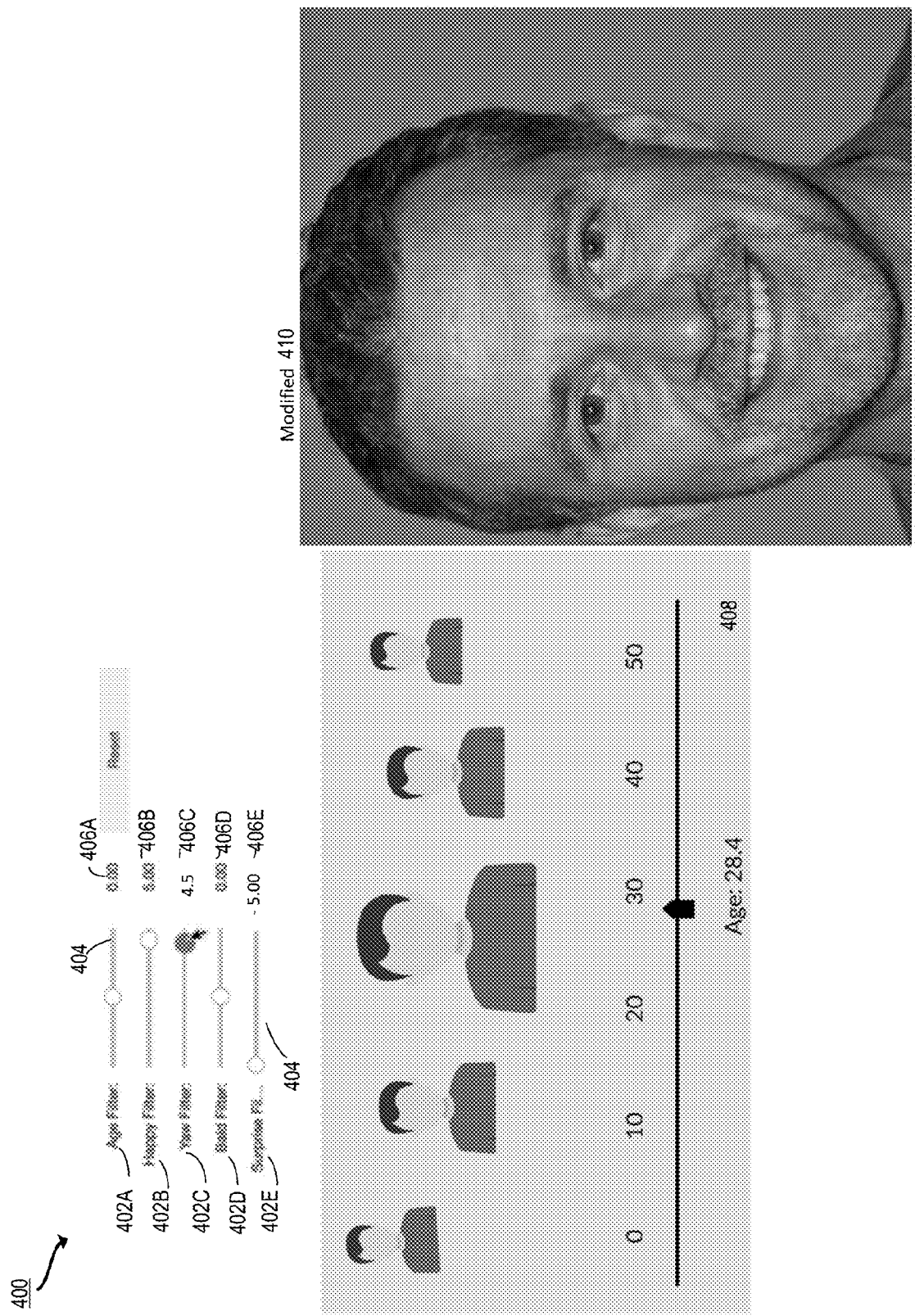
FIG. 4 depicts an example of an interface for slider-based image editing according to certain embodiments of the present disclosure.

One or more GUIs provided by the editor interface 104 may also include user-selectable elements that enable a user to specify the edits or modifications to be performed. For example, a GUI may display one or more sliders (e.g., as shown in FIG. 4) that can be manipulated by the user, each slider corresponding to an attribute of the image to be edited. Other elements provided by the GUIs may include text entry fields, buttons, pull-down menus, and other user-selectable options. In certain implementations, the editor interface 104 may be part of a content editing software such as Adobe Photoshop®, which is capable of receiving and editing digital content (e.g., digital photographs or other images).

Figure 7:
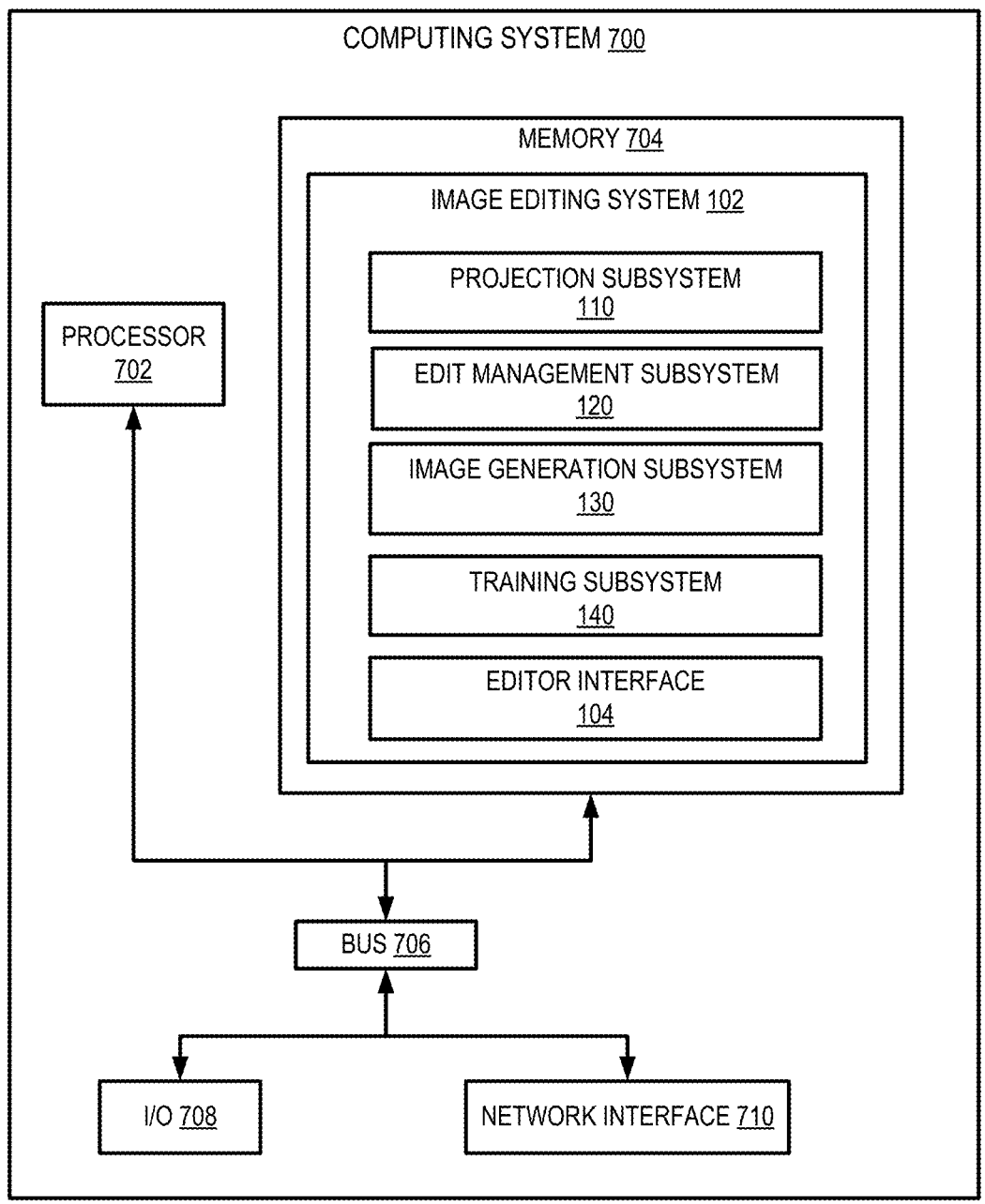
FIG. 7 depicts an example of a computing system that performs certain operations described herein according to certain embodiments of the present disclosure.
Figure 8:
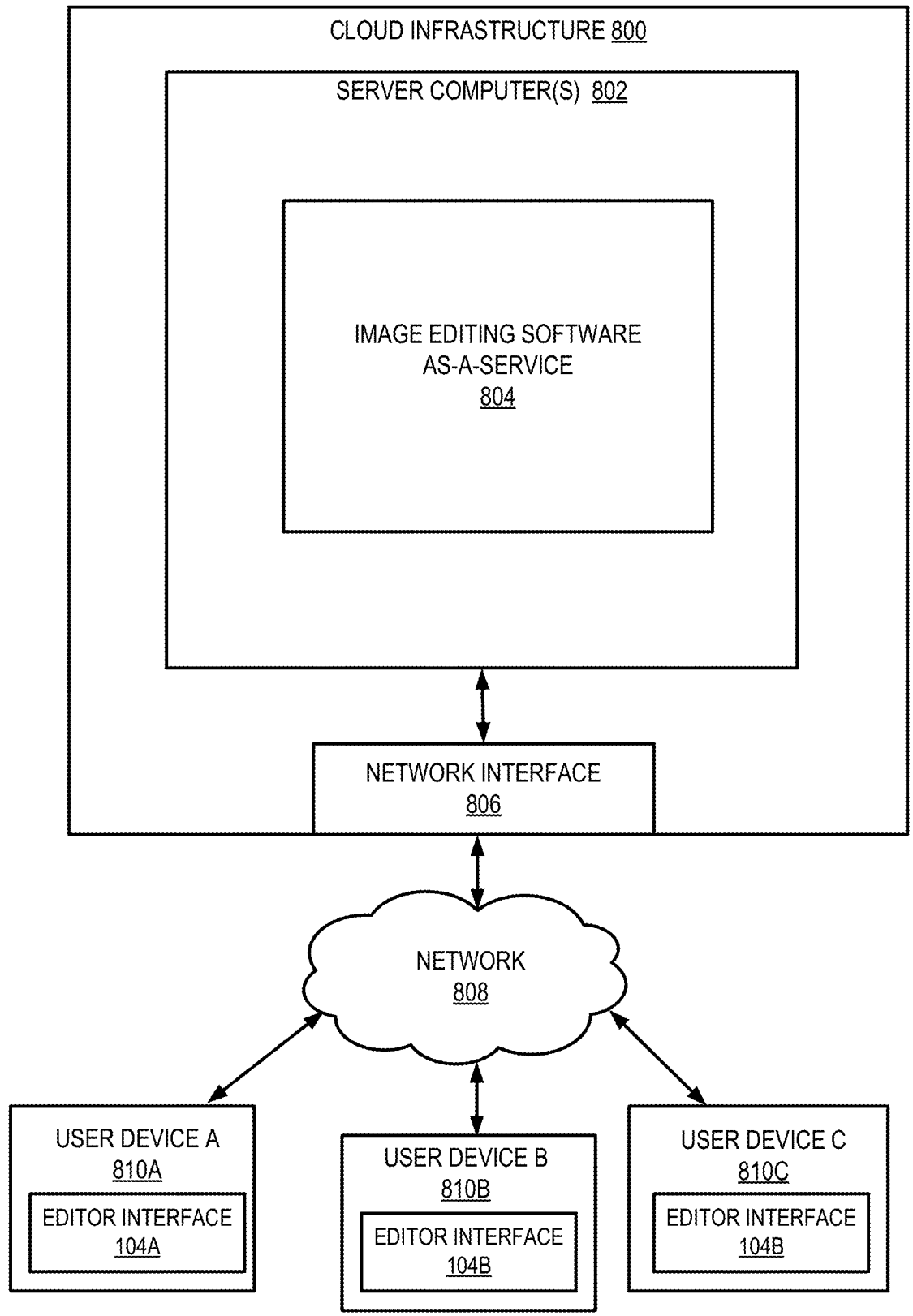
FIG. 8 depicts an example of a cloud computing environment that performs certain operations described herein according to certain embodiments of the present disclosure.

In some embodiments, the image editing system 102 and the editor interface 104 execute on a computing device, which may be used by a user. Examples of a computing device include, but are not limited to, a personal computer, a tablet computer, a desktop computer, a processing unit, any combination of these devices, or any other suitable device having one or more processors. In some other embodiments, the image editing system 102 and the editor interface 104 may operate on different computing systems, which may be communicatively coupled to each other. Examples of computer platform and implementations that may be used to implement the image editing system 102 are depicted in FIGS. 7 and 8 and described below.

The image editing system 102 may comprise multiple subsystems, which work in cooperation to generate edited output images 150. In the embodiment depicted in FIGS. 1A-1B, the image editing system 102 comprises a projection subsystem 110, a training subsystem 140, an edit management subsystem 120, and an image generation subsystem 130. Computing environment 100 depicted in FIGS. 1A-1B is merely an example and is not intended to unduly limit the scope of claimed embodiments. Many variations, alternatives, and modifications are possible. For example, in some implementations, the image editing system 102 may have more or fewer subsystems than those shown in FIGS. 1A-1B, may combine two or more subsystems, or may have a different configuration or arrangement of subsystems. The various systems, subsystems, and other components depicted in FIGS. 1A-1B may be implemented in software (e.g., code, instructions, program) only executed by one or more processing units (e.g., processors, cores) of the respective systems, using hardware only, or combinations thereof. The software may be stored on a non-transitory storage medium (e.g., on a memory device).

The various subsystems of the image editing system 102 can be implemented in the same computing system or different, independently operated computing systems. For example, the edit management subsystem 120 could be a separate entity from the projection subsystem 110, the image generation subsystem 130, and the training subsystem 140, or the same entity. The image editing system 102 may execute on a server separately from the editor interface 104, or other embodiments can involve the image editing system 102 being built into a software application executing the editor interface 104 on a user device.

One or more of the subsystems of the image editing system 102 include trained machine learning models or include components that use machine learning models that have been trained. For example, in the embodiment depicted in FIGS. 1A-1B, the training may be performed by a training subsystem 140, which may perform the training using various training data 142. In some implementations, the training subsystem 140 includes, or is communicatively coupled to, one or more data storage units 141 for storing the training data 142.

An edit management subsystem 120 configures edits to the input image 106 using an edit configurer 122 and a feedback generator 124. A projection subsystem 110 generates a latent space representation 113 representing the input image 106. A latent code transformer 114 generates a modified latent space representation 117 by applying one or more transformations, including the edits configured by the edit management subsystem 120, to the latent space representation 113 of the input image. An image generation subsystem 130 includes a generator 132 that generates an image according to the transformed latent space representation 117. In some aspects, the image generation subsystem 130 further includes a postprocessor 134 that performs postprocessing of the generated image 139 to produce the output image 150, which may be returned to the editor interface 104. In some embodiments, the training subsystem 140 trains one or more components of the latent code transformer 114 using the training data 142 and one or more loss functions. The loss functions used to train the components of the latent code transformer 114 can include an attribute regression loss 144A, an image domain supervision loss 144B, and a sparsity loss 144C. In some implementations, the training subsystem 140 trains the generator 132 using a discriminator 146. In some implementations, the training subsystem 140 trains the encoder 112 using one or more additional loss functions.

The edit management subsystem 120 includes hardware and/or software configured to control image edits. The edit management subsystem 120 includes an edit configurer 122 and a feedback generator 124. The edit configurer 122 receives edit parameters 108, e.g., editor configured modification instructions, from the editor interface 104. For example, edit parameters 108 may specify that an image of a person should be modified to include red hair and glasses. The edit configurer 122 identifies, from the provided edit parameters 108, an edit attribute 122A and an edit magnitude 122B. The edit attribute 122A is a target attribute to be edited. For example, for an image of a human face, the smile, hair length, age, and gender are examples of attributes that can be selected for editing. For an image of a shoe, attributes that can be edited include heel size, whether there is an open toe, and the color. The edit magnitude 122B is a degree of change to make to the edit attribute 122A. The edit magnitude 122B may be a target attribute value for the edit attribute 122A. For example, a user can interact with a slider of the editor interface 104 to indicate that the smile should be increased or decreased by a certain amount. In some implementations, the attribute modifier supports multiple attribute editing—for example, the attribute modifier will receive indications of several edit attributes 122A and edit magnitudes 122B that are processed together (e.g., increase smile by +1 unit and decrease age by—2 units).

The feedback generator 124 prepares and transmits edit feedback 128 to the editor interface 104. Examples of such edit feedback 128 includes metrics showing how much an attribute is being modified (e.g., numerical values showing the selected edit magnitude 122B, as shown in 406A-406E of FIG. 4). Alternatively, or additionally, the edit feedback 128 includes preview images showing how the final output image will appear given the current edit parameters.

The projection subsystem 110 includes hardware and/or software configured to identify and transform latent space representations of images. The projection subsystem 110 receives as input the input image 106 and generates as output a modified latent space representation of the input image 117, which is a vector string of numbers reflecting edits to be applied to the input image 106.

In some implementations, the latent space representation 113 is generated using an encoder 112. Alternatively, or additionally, the latent space representation is generated using an optimizer 114A of the latent coder transformer 114, as shown in FIG. 1B. In some implementations, the projection subsystem 110 includes an encoder 112 configured to receive an input image 106, project the input image 106 into a latent space representation 113, and output the latent space representation 113. The projection subsystem 110 further includes a latent code transformer 114, as illustrated and described in further detail with respect to FIG. 1B.

In some implementations, the encoder 112 is a machine learning model that has been trained to discover a latent space representation of the input image 106. The latent space representation (also referred to as semantic latent code or latent code) is a string of numbers (e.g., a n-dimensional vector, containing a value for each of the n-dimensions) that, when provided as input to the generator, creates a particular image (e.g., to replicate the input image 106). The encoder 112 is a machine learning model trained to generate such a latent space representation. The encoder 112 may, for example, be a feed forward network trained to encode the input image 106. Given an input image 106 and a generator 132, the encoder discovers a latent space representation of the input image $W^{in}_p$, such that when the latent space representation of the input image $W^{in}_p$ is input to the generator 132, the resulting generated image 139 perceptually resembles the target input image 106.

The latent code transformer 114 includes functionality to optimize, transform, and/or edit the latent space representation 113 and/or an initial latent code to generate the modified latent space representation 117. Referring now to FIG. 1B, in some aspects, the latent code transformer 114 includes an optimizer 114A, a mapper 114B, an augmenter 114C, and an editing non-linear latent filter neural network 114D.

The optimizer 114A includes functionality to optimize a latent code to generate an optimized latent space representation that, when provided as input to the generator 132, results in an image that looks like the input image. In some aspects, the optimizer 114A takes an initial latent space representation 113 (e.g., as generated by the encoder 112) and the input image 106 as input and minimizes a loss between the initial latent space representation 113 and the input image 106. Different loss functions can be implemented for optimization, such as a pixel-by-pixel comparison of the input image 106 and an image generated from the initial latent space representation 113. The loss is minimized until the image generated based upon the latent space representation of the input image is perceptually similar to the input image 106 to a desired degree. This can be performed in conjunction with the encoder 112-by optimizing the latent space representation 113 generated by the encoder 112 to further increase similarity to the input image. Alternatively, the optimizer 114A can be applied to a random latent code to generate the latent space representation without the use of an encoder. In this case, the initial latent space representation used as input for the optimizer 114A may be randomly sampled from the latent space (e.g., from a Gaussian distribution) and optimized with respect to the input image to generate the latent space representation of the input image 113.

The mapper 114B includes functionality to map the latent space representation 113 from one latent space to another. For example, the encoder 112 and/or optimizer 114A generates a latent code in a first space, Z space, and the mapper 114B applies a mapping to transform the latent code from the Z space to a second space, W space. This mapping is executed in some implementations to facilitate image editing by transforming the latent space such that movement in the latent space smoothly correlates with changes to one or more target attributes. As an example, in the W space, incrementing the latent variable in a particular direction continuously makes hair color lighter in an image while maintaining the overall look of the image. In the Z space, such smooth changes with direction in the latent space are not always possible, as the Z space is more "entangled." W space transformation techniques and advantages are described in Karras et al., "A Style-Based Generator Architecture for Generative Adversarial Networks", https://arxiv.org/pdf/1812.04948.pdf (2019) ("StyleGAN") and Shen et al., InterFaceGAN: Interpreting the Disentangled Face Representation Learned by GANs, arXiv:2005.09635 (2020).

The augmenter 114C includes functionality to augment the latent space representation 113 from one dimensionality to another (e.g., to an extended latent space, also referred to as "W-plus" or "$W_p$" space). For example, the augmenter 114C transforms W space latent code, which is 512 dimensions, to $W_p$ space latent code, which is 512×18 dimensions. This facilitates image editing based on continuous properties of the latent space. $W_p$ space transformation techniques and advantages are described in Abdal et. al., "Image2StyleGAN: How to Embed Images Into the StyleGAN Latent Space?," arXiv:1904.03189 (2019).

The editing non-linear latent filter neural network 114D includes functionality to edit attributes in an image by modifying the latent space representation 113 in a non-linear fashion. The editing non-linear latent filter neural network may, for example, be a lightweight neural network. The editing non-linear latent filter neural network 114D is a trained neural network that uses a target attribute value of the edit attribute 122A to make the edits. When the editing non-linear latent filter neural network 114D is applied to a latent space representation of an image, the editing non-linear latent filter neural network 114D modifies one or more attributes in the image. For example, a non-linear latent filter corresponds to operations implemented by the editing neural network to apply a non-linear modification to a latent space representation of an image to edit an attribute, as described herein. After the editing non-linear latent filter neural network 114D applies the edits to the latent space representation of the input image 113, this results in a modified latent space representation 117, which is passed to the image generation subsystem 130 for further processing.

Returning to FIG. 1A, the image generation subsystem 130 includes hardware and/or software configured to generate an output image 150 based on input code (e.g., the modified latent space representation 117). The image generation subsystem includes a generator 132 and a postprocessor 134.

The generator 132 includes a machine learning model which has been trained to generate a generated image 139 based on input latent code. In some implementations, the generator 132 is a neural network. The generator 132 is pre-trained to generate data that is similar to a training set. Depending on the type of image to be edited by the image editing system 102, the generator may be trained to generate an image of a human face, a landscape, a dog, a cat, a shoe, and so forth. In some aspects, the generator 132 is trained to generate a specific type of image, as such targeted training can produce very realistic results. The generator 132 can produce a random new image (e.g., of a person that does not exist) based on random input (e.g., from a normal or Gaussian distribution). The generator can produce a new image that looks like an input image 106 using the techniques described herein and an input latent code that is generated based on the input image 106. In some implementations, the generator 132 is part of a Generative Adversarial Network (GAN) 138, and is trained in a zero-sum game with the discriminator 145.

In some embodiments, the postprocessor 134 ingests the generated image 139 and performs processing to prepare the output image 150. In some aspects, the projection subsystem 110 projects a portion of the input image 106 (e.g. a cropped region such as a face or a flower from within a larger image). In such cases, the generated image 139 is a subset of the input image 106, and the postprocessor 134 integrates the generated image 139 into the remaining portion of the input image 106 to generate the output image 150. Other postprocessing performed by postprocessor 134 may include smoothing portions of the generated image 139, increasing or decreasing the pixel size of the generated image 139, and/or combining multiple generated images 119.

The training subsystem 140 includes hardware and/or software configured to train one or more machine learning models as used by the image editing system 102. The training subsystem 140 includes a discriminator 146. The discriminator 146 is part of the GAN 138 including the generator 132, and evaluates the output of the generator 132 to train the generator 132. The discriminator 146 compares images produced by the generator 132 to real images, and the generator 132 works to "trick" the discriminator into determining that a generated image is actually a real image. Such a competition between the discriminator 146 and the generator 132 teaches the generator 132 to produce extremely realistic images.

The training subsystem 140 further includes functionality to train the encoder 112, including one or more loss functions that are minimized to train the encoder 112 to generate latent code that accurately represents the input image 106 and can be processed efficiently by the other elements of the projection subsystem 110. In some aspects, the training subsystem further includes functionality to train the edit configurer 122 and/or postprocessor 134.

The training subsystem 140 is further configured to train the latent code transformer 114 to edit images. This may include training an editing non-linear latent filter neural network 114D using one or more loss functions. The one or more loss functions may include an attribute regression loss 144A to minimize a difference between a target attribute value for the edit attribute 122A and a generated attribute value for the edit attribute 122A, an image domain supervision loss 144B for segmenting a portion of the input image 102 associated with the edit attribute 122A, and/or a sparsity loss 144C based upon an L1 norm of training latent code and an output of the latent code transformer 140 given the training latent code.

The data storage unit 141 can be implemented as one or more databases or one or more data servers. The data storage unit 141 includes training data 142 that is used by the training subsystem 140 to train the engines of the image editing system 102. The training data 142 includes latent data 142A, which includes latent space representations of images. The latent data 142A can include latent space representations of thousands of random images of a type that the generator 132 should be trained to generate (e.g., hundreds of thousands of random faces).

Example Techniques for Editing Images Using Non-Linear Latent Filters

Figure 2:
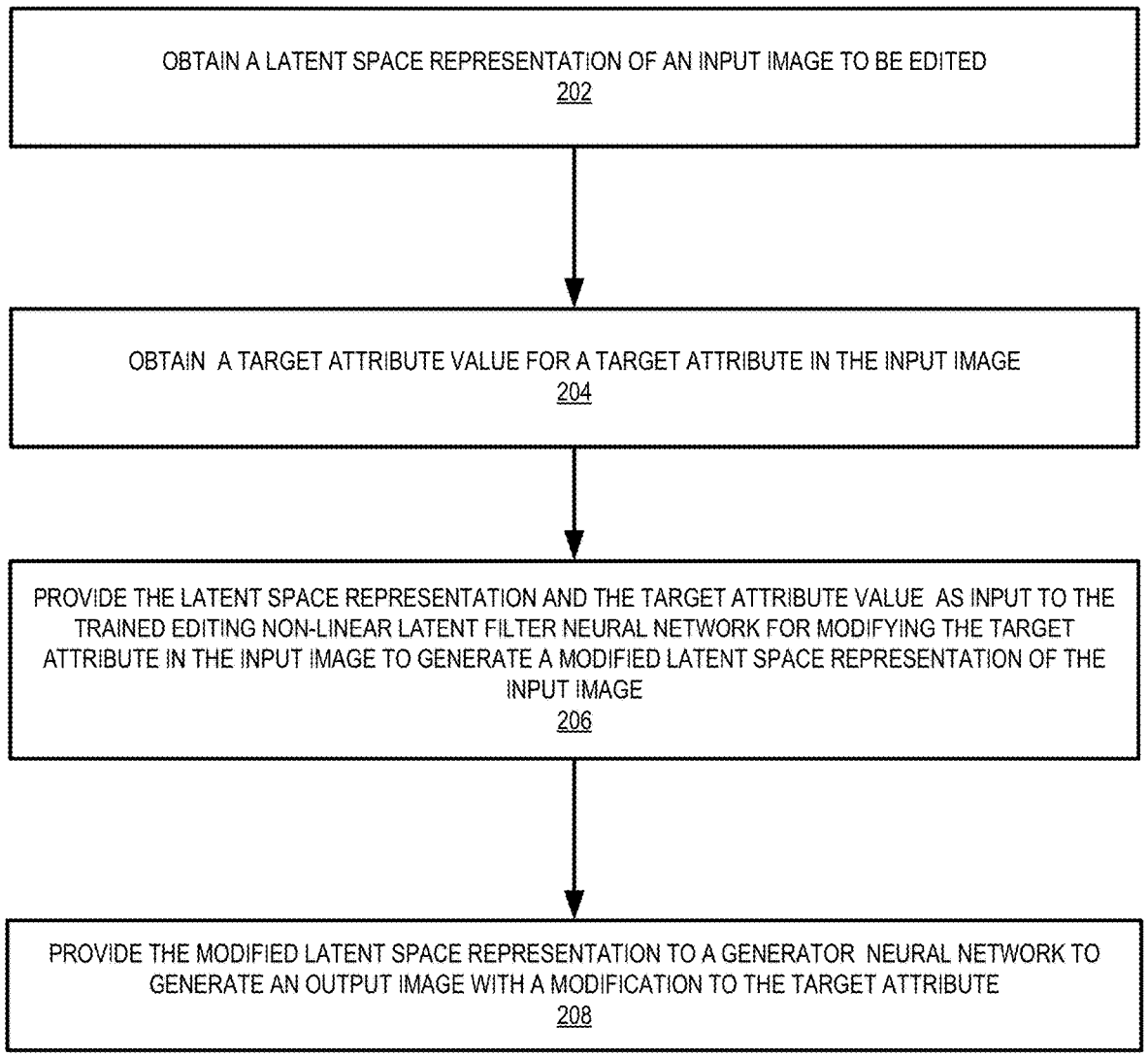
FIG. 2 depicts an example of a process for editing an image using an editing non-linear latent filter neural network according to certain embodiments of the present disclosure.
Figure 3:
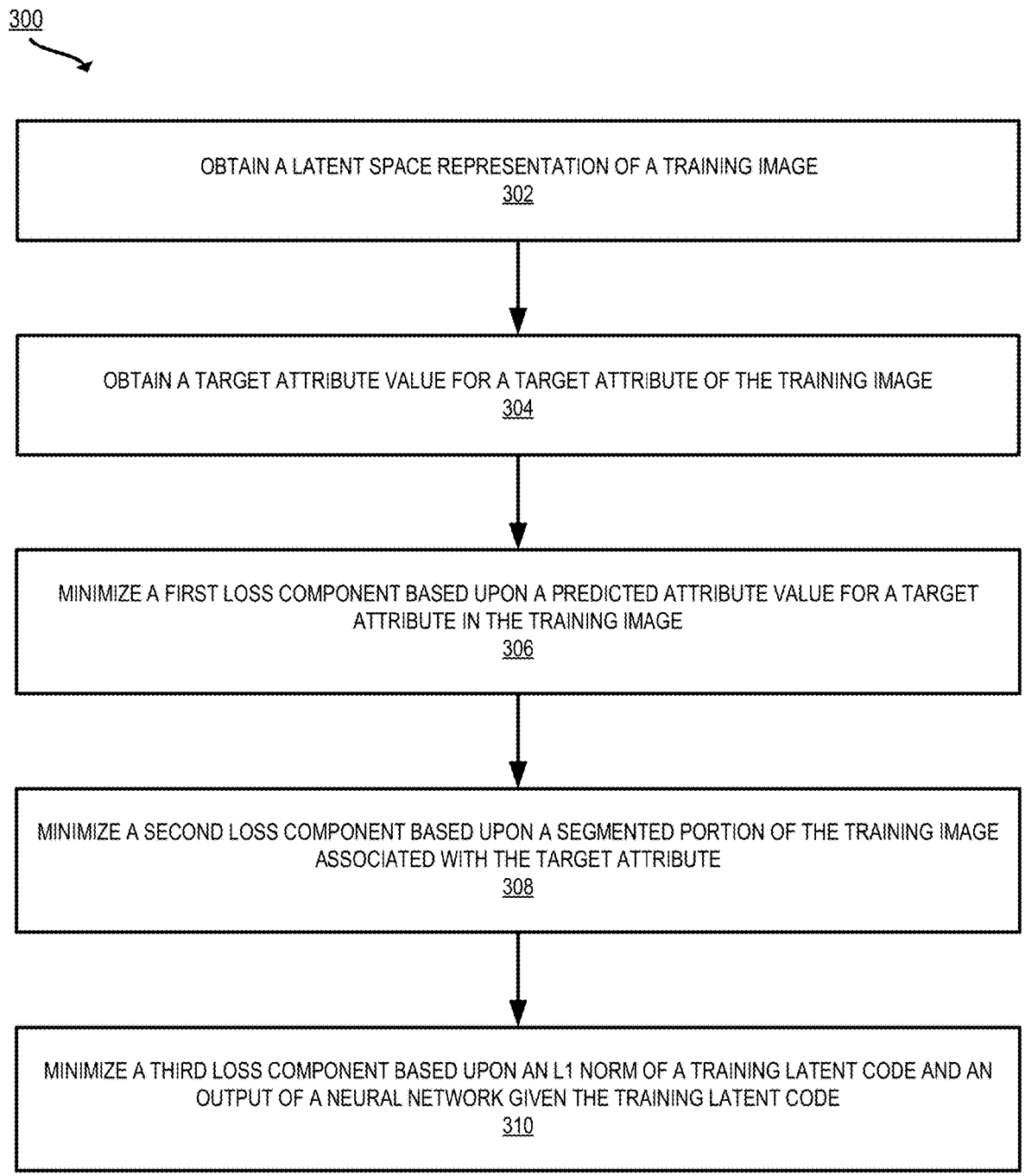
FIG. 3 depicts an example of a process for training an editing non-linear latent filter neural network according to certain embodiments of the present disclosure.

FIGS. 2-3 illustrate an example process 200-300 for applying (in FIG. 2) and training (in FIG. 3) an editing non-linear latent filter neural network for use in editing a target attribute in an image without undesirable modification to other non-target attributes. The processing depicted in FIGS. 2-3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 2-3 and described below is intended to be illustrative and non-limiting. Although FIGS. 2-3 depict the various processing steps occurring in a particular sequence or order, this is not intended to be limiting. In certain alternative embodiments, the processing may be performed in some different order or some steps may also be performed in parallel. In some implementations, one or more process blocks of FIGS. 2-3 may be performed by an image editing system (e.g., the image editing system 102 of FIGS. 1A-1B). In some implementations, one or more process blocks of FIGS. 2-3 may be performed by another device or a group of devices separate from or including the image editing system 102 (e.g., the editor interface 104 executing on a user device).

With reference to FIG. 2, At 202, the image editing system (e.g., the projection subsystem 110 of the image editing system) obtains a latent space representation of an input image. For example, the projection subsystem generates a latent space representation of the input image by applying a machine learning model to the input image. The projection subsystem may provide the input image as input to one or more machine learning models trained to generate latent space representations of images.

In some implementations, the machine learning model is an encoder. The encoder receives the input image as input, and is trained to output a latent space representation of the input image. For example, the encoder is a neural network that generates a latent space representation z of the input image in Z space, as described above with respect to FIG. 1B. In some implementations, a generated Z space latent space representation is further modified to map to W space and/or augmented to $W_p$ space, as described above with respect to FIG. 1B.

Alternatively, or additionally, the machine learning model is an optimizer (e.g., the Limited-memory Broyden-Fletcher-Goldfarb-Shanno algorithm (L-BFGS) or another suitable optimizer). The projection subsystem provides the input image and an initial latent code to the optimizer as input. This input latent code may either be a random latent code sampled from the latent space (e.g., according to a Gaussian distribution) or an initial latent space representation of the input image generated by the encoder. A loss function is selected. The loss function may include one or more components. For example, the loss function may include a pixel loss component that compares an image generated from the latent code to the input image on a pixel-by pixel basis. The loss function may include additional components, such as a semantic loss component. The selected loss function, the input image, and an initial latent code are input to an optimizer, the loss is minimized, and the output is the latent space representation of the input image obtained at 202.

Alternatively, in some implementations, the projection subsystem obtains the latent space representation of the input image as direct input. For example, the latent space representation of the input image may be received from an external computing device that generated the latent space representation of the input image.

At 204, the projection subsystem obtains a target attribute to be edited and a target attribute value for the edit. In some implementations, an editor selects the target attribute and the target attribute value via the editor interface, and this is processed by the edit configurer which provides the selected edit attribute (e.g., age, gender, etc.) and target attribute value (e.g., a numerical value indicating a desired final value for the attribute to the projection subsystem, which can be configured via sliders as shown in FIG. 4).

As a specific example, using sliders as depicted in FIG. 4, a user can provide input specifying desired attribute modifications. The image editing system may cause display of a user interface. Causing display of a user interface may include transmitting instructions for rendering the user interface to an external user device. Alternatively, or additionally, causing display of the user interface may include rendering the user interface on a display component of the image editing system. The user interface includes interactive components such as sliders, text entry boxes, and/or the like. These interactive components are configured to control respective attributes including the target attribute. Via the interactive components, the image editing system may receive input specifying the modification and target attribute value for the target attribute. For example, based on a user moving a slider for a particular attribute, the image editing system determines that attribute as the target attribute to be edited. Based on a degree of modification specified by the user input (e.g., how far the slider is moved), the image editing system may increase or decrease the target attribute value for the edit.

At 206, the projection subsystem provides the latent space representation obtained at 202 and the target attribute value identified at 204 to a trained editing non-linear latent filter neural network for modifying the target attribute in the input image to generate a modified latent space representation of the input image. For example, given the latent space representation $W_p^{in}$ for an input image, the target attribute value at, and the trained editing non-linear latent filter neural network H, the projection subsystem provides the latent space representation and the target attribute value to the trained editing non-linear latent filter neural network to edit the value of the attribute a. The trained editing non-linear latent filter neural network applies changes to the latent space representation, based upon the specified target attribute value, to generate a modified latent space representation $W_p^{out}$, where $W_p^{out} = H(W_p^{in}, a_t)$. The output modified latent space representation has the target attribute value at. The trained editing non-linear latent filter neural network modifies the input latent space representation to have the target attribute value based on learned non-linear mappings. In some aspects, the trained editing non-linear latent filter neural network receives as input multiple target attribute values corresponding to multiple attributes. The trained editing non-linear latent filter neural network can modify multiple attributes substantially simultaneously. Training techniques for training the editing non-linear latent filter neural network to apply such modifications based on a target attribute value are described below with respect to FIG. 3.

At 208, the image editing system (e.g., the image generation subsystem 130) provides the modified latent space representation as input to a generator neural network to generate an output image with a modification to the target attribute. As described above with respect to FIG. 1A, the generator neural network has been trained to receive a latent space representation of an image as input, and generate a corresponding image as output. Image generation with a generative model is described in, e.g., Goodfellow et al., Generative Adversarial Nets, NIPS, 2014 (arXiv: 1406.2661v1) and Karras, "A Style-Based Generator Architecture for Generative Adversarial Networks", https://arxiv.org/pdf/1812.04948.pdf (2019) ("StyleGAN", supra).

One or more operations in blocks 206-208 implement a step for generating an output image comprising a change in the target attribute corresponding to the target attribute value by providing the latent space representation and the target attribute value as input to the trained first neural network for modifying the target attribute in the input image. For instance, at block 206, the projection subsystem provides the latent space representation and the target attribute value to a trained editing non-linear latent filter neural network for modifying the target attribute in the input image to generate a modified latent space representation of the input image, as described above, and at block 208, the image generation subsystem provides the modified latent space representation as input to a generator neural network to generate an output image with a modification to the target attribute, as described above.

In some instances, the image editing system may select a subset of layers of the generator neural network that are associated with the target attribute and provide the modified latent space representation to the selected subset of layers. The layers can be selected based on correlation with the target attribute (e.g., certain layers are or are not associated with attributes such as hair color or lighting). Targeting the selected layers of the generator neural network in this fashion can help to avoid unwanted changes to non-target attributes.

In some embodiments, the target attribute is continuously edited using the operations of FIG. 2. For example, responsive to user input via a slider gradually increasing for an attribute, the image editing system modifies the attribute to multiple states. As a specific example, as a user increases the age slider, the target attribute is continuously modified to smoothly and continuously edit the age attribute by repeatedly performing the processing of blocks 202-208.

FIG. 3 illustrates a training process 300 for training the editing non-linear neural network used at block 206 of FIG. 2. In some embodiments, at 302, the training subsystem 140 of the image editing system 102 obtains a latent space representation of a training image. For example, the training subsystem 140 obtains the latent space representation of the training image by retrieving the training data 142 from the data storage unit 141. In some implementations, the obtained latent space representation has been labeled to denote attributes. For example, 500,000 latent codes labeled with attributes are obtained. In the context of images containing faces, each such image may have associated one or more labels identifying the various attributes, including editable attributes, represented by the image. For example, a latent space representation of a training image may have labels associated with it indicating whether a particular attribute is present in that image or not, where examples of attributes are glasses (or other accessories, in general, whether or not present), age (e.g., on a scale of 0 to 100), hair color (e.g., ranging from lightest to darkest), smile (e.g., present or not and, if present, the degree of the smile), anger, sadness, skin color, hair type, etc. In the context of shoe images, example attributes include color, heel size, shoelaces (present or not present), and so forth.

Alternatively, or additionally, obtaining the latent space representation of the training image may include generating the latent space representation. Generating the latent space representation of the training image can include encoding and/or optimizing the latent space representation from real input training images (e.g., in a similar fashion as described above with respect to block 202 of FIG. 2). For example, the training subsystem generates a latent space representation of the training image by obtaining a training image, and applying a machine learning model, such as an encoder and/or an optimizer, to the training image. The training subsystem may provide the training image as input to one or more machine learning models trained to generate latent space representations of images. Generating the latent space representation of the training image can further include labeling the latent space representation of the training image.

At 304, the training subsystem 140 obtains a target attribute value for a target attribute of the training image. The training subsystem may select the target attribute and the target attribute value for the training image by sampling the target attribute value from a pre-determined range. In other examples, the training subsystem selects the target attribute value based on training data specifying a target attribute value or by selecting target attribute values in turn sequentially or randomly. Alternatively, the target attribute and the target attribute value can be manually selected via user input, a which is processed by the image editing system to identify the selected edit attribute (e.g., age, gender, etc.) and target attribute value.

At 306, the training subsystem 140 minimizes a first loss component (e.g., the attribute regression loss 144A of FIG. 1A) based upon a predicted attribute value for a target attribute in the training image. The attribute regression loss can be defined as:

$$L_{attr}=\|f^A(g(H(W_p^{in}, a_t)))-a_t\|, \quad [1]$$

where $f_A$ is an attribute prediction model, g is a generator neural network, H is the editing non-linear latent filter neural network, $W_p^{in}$ is the latent space representation of the training image, and $a_t$ is the target attribute value for the target attribute.

The attribute regression loss [1] is computed using an attribute prediction model $f_A$.

An attribute prediction model is a machine learning model such as a neural network that has been trained to predict attribute values (e.g., glasses=1, age=55, and so forth) for a given image. (See, e.g., Abrar H. Abdulnabi et al., "Multi-task CNN Model for Attribute Prediction," IEEE Transactions on Multimedia, pp. 1949-1959 (2015)).

To compute the attribute regression loss [1], the latent space representation of the training image, along with the target attribute value for the target attribute, are provided as input to the editing non-linear latent filter neural network. The editing non-linear latent filter neural network outputs a modified latent space representation with a change to the target attribute based on the target attribute value. For example, given the target attribute of age, if the target attribute value is 88, the latent space representation is edited so that the ultimate output image will appear to be 88. This modified latent space representation is provided as input to the generator neural network to generate a generated training image. The generated training image is then provided as input to the attribute predictor model, which predicts an attribute value. For example, if, during training, the editing non-linear latent filter neural network produces an image comprising a face that appears to be 77 years of age, the attribute predictor model predicts an attribute value of 77. A loss between the predicted attribute value and the input target attribute value is minimized. This minimized loss is used to train the editing non-linear latent filter neural network. This attribute regression loss [1] serves to teach the editing non-linear neural network to accurately generate a latent space representation with desired target attribute values, and has been found to have strong supervision properties.

The training subsystem updates the editing non-linear latent filter neural network by minimizing the attribute regression loss [1]. For example, the editing non-linear latent filter neural network includes a plurality of nodes, and weights associated with the nodes are updated according to the minimized loss. In some implementations, the editing non-linear latent filter neural network includes multiple layers including an input layer, an output layer, and multiple intermediate layers disposed between the input layer and the output layer. The training subsystem uses backpropagation to trace the loss back from the output layer through the intermediate layers of the editing non-linear latent filter neural network to the input layer. The values of the weights associated with the connections between the nodes in the neural network are thereby updated. The error is backpropagated through the layers by adjusting the weights associated with connections of nodes at each layer. This process is repeated until the output error is below a predetermined threshold.

At 308, the training subsystem 140 minimizes a second loss component (e.g., image domain supervision loss 144B) based upon a segmented portion of the training image associated with the target attribute. For example, the training subsystem 140 can use a segmentation model to predict a mask M for a portion of the training image that is associated with the target attribute. A segmentation model is a machine learning model (e.g., a neural network) trained to segment an image into different regions (e.g., tree, car, human face or parts of a human face, and so forth). In some aspects, the segmentation model assigns a label to each pixel for the corresponding region identified in the image. Suitable segmentation models and techniques for image segmentation are described in, e.g., Minaee et. al., "Image Segmentation Using Deep Learning: A Survey," *IEEE Transactions on Pattern Analysis and Machine Intelligence,* doi: 10.1109/TPAMI.2021.3059968 (2020).

Based on the segments of the image identified by the segmentation model, the training subsystem applies a mask. For example, the mask is a binary mask and for a target attribute of eye glasses. A value of 1 can represent portions of the training image that are outside the eye-glass region and a value of 0 can represent a portion of the training image that is within the eye-glass region.

In some embodiments, the image domain supervision loss is defined as:

$$L_{img}=\|M\odot g(H(W_p^{in}, a_t))-M\odot g(W_p^{in})\| \quad [2]$$

To compute the image domain supervision loss [2], the latent space representation of the training image, along with the target attribute value for the target attribute, are provided as input to the editing non-linear latent filter neural network. The editing non-linear latent filter neural network outputs a modified latent space representation with a change to the target attribute based on the target attribute value. The modified latent space representation is provided as input to the generator neural network to generate a generated edited training image. The training subsystem performs element-wise multiplication of the mask and the generated edited training image. The edited region is masked out, leaving the region that does not include the attribute to be edited. The latent space representation of the training image is also provided as input to the generator neural network to produce a generated image. The generated image is piecewise multiplied by the mask to produce a masked generated image without edits. The training subsystem minimizes a loss between the masked edited generated image and the masked generated image without edits. The loss can be minimized by backpropagation in a similar fashion as described above with respect to block 306. The loss is minimized between regions in the unedited generated image that do not include the attribute to be edited, and regions in the edited generated image that do not include the attribute to be edited. This process teaches the editing non-linear latent filter neural network to keep these regions consistent. This can ensure that regions that are not related to the target attribute are not modified by the editing non-linear latent filter neural network.

At block 310, the training subsystem 140 minimizes a third loss component (e.g., sparsity loss 144C) based upon an L1 norm of the latent space representation of the training image and an output of the editing non-linear latent filter neural network. The sparsity loss can be defined as:

$$L_{sparse}=\|(H(W_p^{in}, a_t)))-W_p^{in}\|_1 \quad [3]$$

The target attribute value and the latent space representation of the training image are provided as input to the editing non-linear latent filter neural network. The editing non-linear latent filter neural network produces an edited latent space representation. The sparsity loss is based on the L1 norm of the edited latent space representation of the training image and the original latent space representation of the training image. The L1 norm is calculated as the sum of absolute vector values. Minimizing an L1 loss based on an L1 norm can be used to focus on variables of interest and disregard useless variables. Given the large size of the latent space, it can be undesirable to modify too many variables when modifying the latent space representation. For example, only a small subset of the latent code should be modified, by only manipulating a small subset of the dimensions in the latent space. In some aspects, domain knowledge is used to select variables of the latent code corresponding to layers of the generator neural network. For example, the first five layers of the generator neural network do not modify lip color. Domain knowledge can be used to disregard latent variables corresponding to the first five layers using the sparsity loss [3] for the target attribute of lip color. Then, changes will only be applied for layers corresponding to the target attribute. Techniques for using a loss based on an L1 norm to enforce sparsity are described in, e.g., Karim, "Intuitions on L1 and L2 Regularisation," Towards Data Science (2018), available at https://towardsdatascience.com/intuitions-on-l1-and-l2-regularisation-235f2db4c261. The sparsity loss [3] can be minimized by backpropagation in a similar fashion as described above with respect to block 306.

When training non-linear latent filters, there is an absence of paired latent codes for training. For example, for an input latent space representation $W_p^{in}$ and a corresponding output latent space representation $W_p^{out}$ with a target attribute value at. The use of the sparsity loss [3] can be used to overcome this issue based on domain knowledge of the latent space. Since the latent space is largely disentangled with respect to different attributes, the sparsity loss can enforce the editing non-linear latent filter neural network only modifying a small portion of the latent codes. This can reduce unwanted changes to non-target attributes, as well as speed up the editing process, as the image editing subsystem refrains from manipulating unnecessary variables.

In some aspects, the editing non-linear latent filter neural network is trained by combining the three loss components described at 606-610, and minimizing the combined loss function. Alternatively, one or more of the loss components can be minimized individually (in turn or by omitting the other loss components) to update the editing non-linear latent filter neural network. The editing non-linear latent filter neural network can be updated based on the minimized loss by updating weights associated with the nodes of the editing non-linear latent filter neural network according to the minimized loss, as described above with respect to block 606.

FIG. 4 illustrates an example user interface 400 for facial attribute editing, according to some embodiments. The user interface 400 includes a set of sliders 404 for controlling attribute edits in an input image.

As illustrated in FIG. 4, each slider 404 corresponds to a particular attribute filter 402A-402E for a particular attribute. The attribute filters are age filter 402A, happy filter 402B, yaw filter 402C, bald filter 402D, and surprise filter 402E. Responsive to user input modifying the slider 404 position for an attribute, that attribute will be continuously adjusted. For example, moving the surprise filter 402E slider 404 to the right results in a more surprised expression, and moving the surprise filter 402E slider 404 to the left results in a less surprised expression. As each slider 404 is adjusted, numerical values 406A-406E indicating the strength of the attribute are modified. For example, as shown in FIG. 4, the happy filter 402B and yaw filter 402C have relatively high values of 5.0 and 4.5. The user interface 400 further includes an output image 410, as modified using the settings configured via the sliders 404, and a preview image 408 showing alternative output images associated with different slider positions for the age filter 402A.

Figure 5:
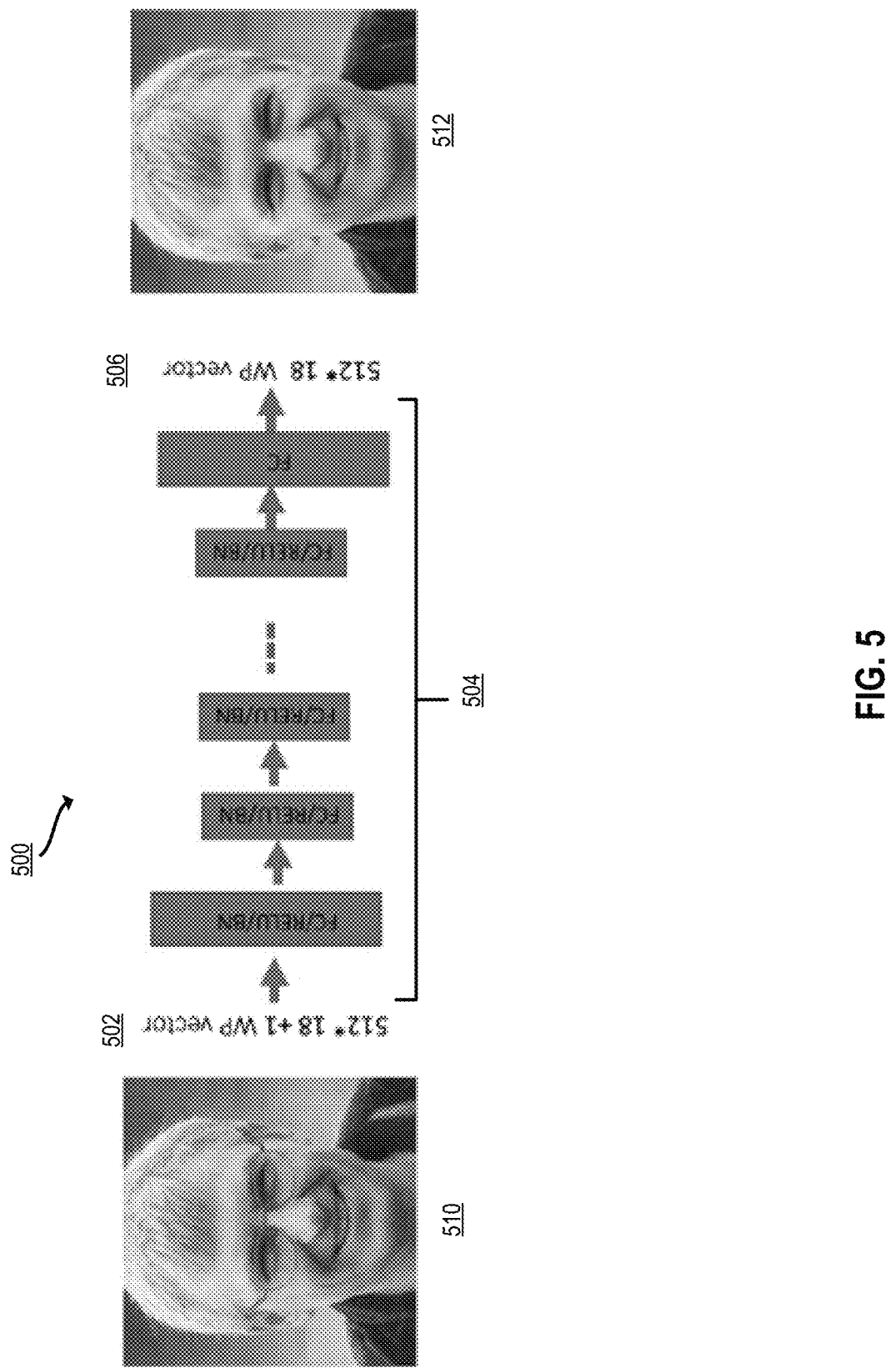
FIG. 5 depicts an example of an editing non-linear latent filter neural network according to certain embodiments of the present disclosure.

FIG. 5 depicts an example schematic diagram of an image editing process 500 using a trained editing non-linear latent filter neural network 504 according to certain embodiments of the present disclosure. The trained editing non-linear latent filter neural network 504 receives a latent space representation 502 of an input image 510. The latent space representation is a 512 by 18 latent vector generated based on the input image. The trained editing non-linear latent filter neural network 504 further receives a target attribute value. For example, the target attribute is glasses. In the input image, glasses are present, which can be represented as a value of 1. The target attribute value is 0, corresponding to an absence of glasses. The latent space representation 502 is passed through the editing non-linear latent filter neural network 504, which includes multiple fully connected (FC) layers with a rectified linear unit (RELU) and batch normalization (BN). The editing non-linear latent filter neural network 504 outputs a modified latent space representation 506 that includes the target attribute value (e.g., 0 in FIG. 5). The modified latent space representation 506 is provided to a generator neural network to generate an output image 512 with a change in the target attribute corresponding to the target attribute value. In this example, the face in the output image 512 does not have glasses.

Figure 6:
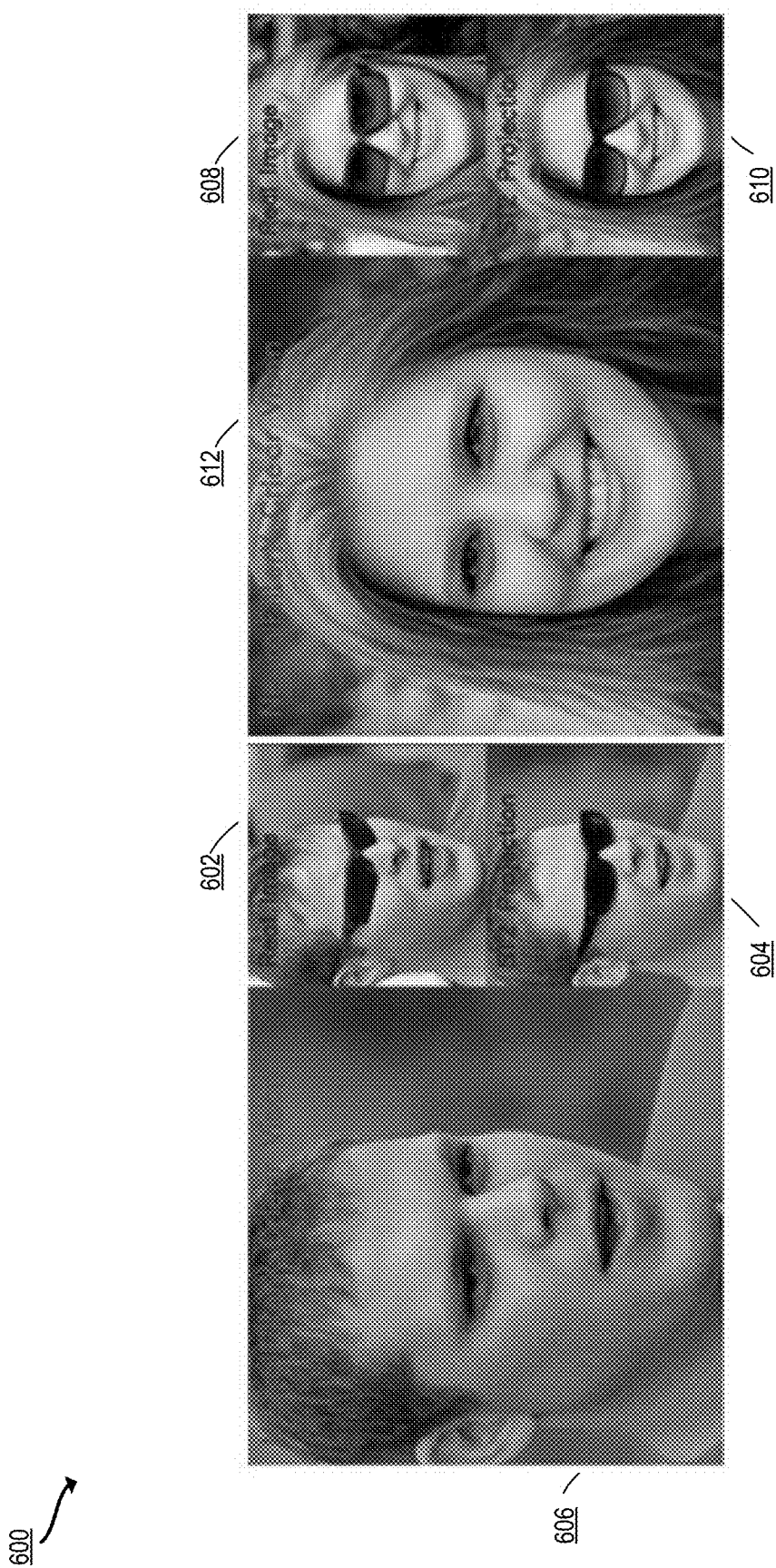
FIG. 6 depicts examples of images edited with the techniques of FIG. 2 according to certain embodiments of the present disclosure.

FIG. 6 illustrates an example of editing results obtained using an editing non-linear latent filter neural network trained with the techniques of the present disclosure. The images 602 and 608 show input images that are to be edited to remove glasses. Images 604 and 610 are projected images corresponding to the input images 602 and 608 respectively. A projected image can be generated by generating a latent space representation of the input image, then generating an image from the latent space representations using the generator neural network (e.g., without edits). Images 606 and 612 are the results of editing the input images 602 and 608 using the editing non-linear latent filter neural network trained using techniques described above with respect to FIGS. 2-3. As shown in the results in images 606 and 612, the output images 606 and 612 look generally realistic and similar to the input images 602 and 608. Unwanted changes to additional attributes are prevented using these techniques to edit the glasses, providing improved image editing.

Example of a Computing System for GAN Based Image Processing

Any suitable computing system or group of computing systems can be used for performing the operations described herein. For example, FIG. 7 depicts examples of computing system 700 that executes an image editing system 102 that includes an edit management subsystem 120 for performing image processing as described herein. In some embodiments, the computing system 700 also executes a projection subsystem 110 for performing latent space projection as described herein, an image generation subsystem 130 for performing image generation as described herein, a training subsystem 140 for performing machine learning model training as described herein, and an editor interface 104 for controlling input and output to configure image edits as described herein. In other embodiments, a separate computing system having devices similar to those depicted in FIG. 7 (e.g., a processor, a memory, etc.) executes one or more of the subsystems 110-140 and the editor interface 104.

The depicted examples of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code that configures the processor 702 to perform one or more of the operations described herein. The program code includes, for example, the image editing system 102, including the projection subsystem 110, the edit management subsystem 120, the image generation subsystem 130, the training subsystem 140, the editor interface 104, or other suitable applications that perform one or more operations described herein. The program code may be resident in the memory device 704 or any suitable computer-readable medium and may be executed by the processor 702 or any other suitable processor. In some embodiments, the projection subsystem 110, the edit management subsystem 120, the image generation subsystem 130, the training subsystem 140, and the editor interface 104 are stored in the memory device 704, as depicted in FIG. 7. In additional or alternative embodiments, one or more of the image the projection subsystem 110, the edit management subsystem 120, the image generation subsystem 130, the training subsystem 140, and the editor interface 104 are stored in different memory devices of different computing systems. In additional or alternative embodiments, the program code described above is stored in one or more other memory devices accessible via a data network.

The computing system 700 can access data in any suitable manner. In some embodiments, some or all of one or more of these data sets, models, and functions are stored in the memory device 704, as in the example depicted in FIG. 7. For example, a computing system 700 that executes the training subsystem 140 can access training data stored by an external system.

In additional or alternative embodiments, one or more of these data sets, models, and functions are stored in the same memory device (e.g., one of the memory devices 704). For example, a common computing system can host the edit management subsystem 120 and the training subsystem 140 as well as the training data. In additional or alternative embodiments, one or more of the programs, data sets, models, and functions described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing system 700 is able to communicate with one or more other computing devices (e.g., a computing device executing the editor interface 104 as depicted in FIG. 1A) via a data network using the network interface device 710.

In some embodiments, the functionality provided by the computing system 700 may be offered via a cloud-based service provided by a cloud infrastructure 800 provided by a cloud service provider. For example, FIG. 8 depicts an example of a cloud infrastructure 800 offering one or more services including image editing software as-a-service 804 that offers image editing functionality as described in this disclosure. Such a service can be subscribed to and used by a number of user subscribers using user devices 810A, 810B, and 810C across a network 808. The service may be offered under a Software as a Service (SaaS) model. One or more users may subscribe to such as service.

In the embodiment depicted in FIG. 8, the cloud infrastructure 800 includes one or more server computer(s) 802 that are configured to perform processing for providing one or more services offered by the cloud service provider. One or more of server computer(s) 802 may implement a projection subsystem 110, edit management subsystem 120, image generation subsystem 130, and training subsystem 140, as depicted in FIG. 7. The subsystems 110-140 may be implemented using software only (e.g., code, program, or instructions executable by one or more processors provided by cloud infrastructure 800), in hardware, or combinations thereof. For example, one or more of the server computer(s) 802 may execute software to implement the services and functionalities provided by subsystems 110-140, where the software, when executed by one or more processors of the server computer(s) 802, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 1502 can include volatile memory, non-volatile memory, or a combination thereof In the embodiment depicted in FIG, 8, cloud infrastructure 800 also includes a network interface device 806 that enables communications to and from cloud infrastructure 800. In certain embodiments, the network interface device 806 includes any device or group of devices suitable for establishing a wired or wireless data connection to the network 808. Non-limiting examples of the network interface device 806 include an Ethernet network adapter, a modem, and/or the like.

The cloud infrastructure 800 is able to communicate with the user devices 810A, 810B, and 810C via the network 808 using the network interface device 806.

An editor interface (e.g., editor interface 104A, editor interface 104B, and editor interface 104C) may be displayed on each of the user devices user device A 810A, user device B 810B, and user device C 810C. A user of user device 810A may interact with the displayed editor interface, for example, to enter an input image and/or image edit parameters. In response, processing for image processing may be performed by the server computer(s) 802.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:
   training an editing non-linear latent filter neural network by minimizing a loss between a predicted attribute value and a target attribute value which are associated with a generated training image;
   obtaining a latent space representation of an input image to be edited and a target attribute value for the target attribute in the input image;
   providing the latent space representation and the target attribute value as input to the trained editing non-linear latent filter neural network for applying a non-linear modification to the target attribute in the input image to generate a modified latent space representation of the input image; and
   providing the modified latent space representation as input to a generator neural network to generate an output image with a modification to the target attribute, corresponding to the target attribute value.

2. The method of claim 1, the loss comprising a first loss component, training the editing non-linear latent filter neural network further comprising:
   minimizing a second loss component based upon a segmented portion of an input training image associated with the target attribute.

3. The method of claim 1, the loss comprising a first loss component, training the editing non-linear latent filter neural network further comprising:
   minimizing a third loss component based upon an L1 norm of a training latent code and an output of the editing non-linear latent filter neural network given the training latent code.

4. The method of claim 1, wherein the generator neural network comprises a plurality of layers, and wherein providing the modified latent space representation as input to the generator neural network further comprises:
   selecting a subset of the layers associated with the target attribute; and
   providing the modified latent space representation to the selected subset of the layers.

5. The method of claim 1, wherein the target attribute is a first target attribute and the target attribute value is a first target attribute value, the method further comprising:
   obtaining a second target attribute value of a second target attribute in the input image; and
   providing second target attribute value, along with the latent space representation and the first target attribute value, as input to the trained editing non-linear latent filter neural network, wherein the output image comprises the modification to the first target attribute corresponding to the first target attribute value as well as a modification to the second target attribute corresponding to the second target attribute value.

6. The method of claim 1, further comprising:
causing display of a user interface comprising a plurality of interactive components configured to control a respective plurality of attributes including the target attribute; and
receiving input specifying the modification to the target attribute, wherein the target attribute value is obtained based on the specified modification.

7. The method of claim 1, wherein obtaining the latent space representation of the input image comprises generating the latent space representation of the input image by applying a machine learning model to the input image.

8. A computing system comprising:
a memory;
a processor;
a non-transitory computer-readable medium comprising instructions which, when executed by the processor, perform the steps of:
training an editing non-linear latent filter neural network by minimizing a loss between a predicted attribute value and a target attribute value which are associated with a generated training image;
obtaining a latent space representation of an input image to be edited and a target attribute value for the target attribute in the input image;
providing the latent space representation and the target attribute value as input to the trained editing non-linear latent filter neural network for applying a non-linear modification to the target attribute in the input image to generate a modified latent space representation of the input image; and
providing the modified latent space representation as input to a generator neural network to generate an output image with a modification to the target attribute, corresponding to the target attribute value.

9. The computing system of claim 8, the loss comprising a first loss component, training the editing non-linear latent filter neural network further comprising:
minimizing a second loss component based upon a segmented portion of an input training image associated with the target attribute.

10. The computing system of claim 8, the loss comprising a first loss component, training the editing non-linear latent filter neural network further comprising:
minimizing a third loss component based upon an L1 norm of a training latent code and an output of the editing non-linear latent filter neural network given the training latent code.

11. The computing system of claim 8, wherein the target attribute is a first target attribute and the target attribute value is a first target attribute value, the steps further comprising:
obtaining a second target attribute value of a second target attribute in the input image; and
providing second target attribute value, along with the latent space representation and the first target attribute value, as input to the trained editing non-linear latent filter neural network,
wherein the output image comprises the modification to the first target attribute corresponding to the first target attribute value as well as a modification to in the second target attribute corresponding to the second target attribute value.

12. The computing system of claim 8, the steps further comprising:

causing display of a user interface comprising a plurality of interactive components configured to control a respective plurality of attributes including the target attribute; and
receiving input specifying the modification to the target attribute, wherein the target attribute value is obtained based on the specified modification.

13. The computing system of claim 8, wherein obtaining the latent space representation of the input image comprises generating the latent space representation of the input image by applying a machine learning model to the input image.

14. The computing system of claim 8, wherein the generator neural network comprises a plurality of layers, and wherein providing the modified latent space representation as input to the generator neural network further comprises:
selecting a subset of the layers associated with the target attribute; and
providing the modified latent space representation to the selected subset of the layers.

15. A non-transitory computer-readable medium having instructions stored thereon, the instructions executable by a processing device to perform operations comprising:
training an editing non-linear latent filter neural network by minimizing a loss between a predicted attribute value and a target attribute value which are associated with a generated training image;
obtaining a latent space representation of an input image to be edited and a target attribute value for the target attribute in the input image;
providing the latent space representation and the target attribute value as input to the trained editing non-linear latent filter neural network for applying a non-linear modification to the target attribute in the input image to generate a modified latent space representation of the input image; and
providing the modified latent space representation as input to a generator neural network to generate an output image with a modification to the target attribute corresponding to the target attribute value.

16. The non-transitory computer-readable medium of claim 15, the loss comprising a first loss component, training the editing non-linear latent filter neural network further comprising:
minimizing a second loss component based upon a segmented portion of an input training image associated with the target attribute.

17. The non-transitory computer-readable medium of claim 15, the loss comprising a first loss component, training the editing non-linear latent filter neural network further comprising:
minimizing a third loss component based upon an L1 norm of a training latent code and an output of the editing non-linear latent filter neural network given the training latent code.

18. The non-transitory computer-readable medium of claim 15, wherein the target attribute is a first target attribute and the target attribute value is a first target attribute value, the operations further comprising:
obtaining a second target attribute value of a second target attribute in the input image; and
providing second target attribute value, along with the latent space representation and the first target attribute value, as input to the trained editing non-linear latent filter neural network,
wherein the output image comprises the modification to the first target attribute corresponding to the first target attribute value as well as a modification to the second target attribute corresponding to the second target attribute value.

19. The non-transitory computer-readable medium of claim 15, the operations further comprising:
   causing display of a user interface comprising a plurality of interactive components configured to control a respective plurality of attributes including the target attribute; and
   receiving input specifying the modification to the target attribute, wherein the target attribute value is obtained based on the specified modification.

20. The non-transitory computer-readable medium of claim 15, the operations further comprising generating the latent space representation of the input image by applying a machine learning model to the input image.

* * * * *